United States Patent
Breneman

(10) Patent No.: US 7,446,777 B2
(45) Date of Patent: Nov. 4, 2008

(54) SYSTEM AND METHOD OF COMPUTING AND DISPLAYING PROPERTY-ENCODED SURFACE TRANSLATOR DESCRIPTORS

(75) Inventor: Curt Breneman, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 372 days.

(21) Appl. No.: 10/949,065

(22) Filed: Sep. 24, 2004

(65) Prior Publication Data

US 2005/0119858 A1 Jun. 2, 2005

Related U.S. Application Data

(60) Provisional application No. 60/506,661, filed on Sep. 26, 2003.

(51) Int. Cl.
G06T 17/00 (2006.01)
(52) U.S. Cl. ..................................... 345/581
(58) Field of Classification Search .................. None
See application file for complete search history.

(56) References Cited

U.S. PATENT DOCUMENTS

| | | | | |
|---|---|---|---|---|
| 5,283,860 | A * | 2/1994 | Einkauf et al. | 345/624 |
| 5,550,960 | A * | 8/1996 | Shirman et al. | 345/582 |
| 6,191,788 | B1 * | 2/2001 | Fuller | 345/419 |
| 6,266,062 | B1 * | 7/2001 | Rivara | 345/419 |
| 6,343,936 | B1 * | 2/2002 | Kaufman et al. | 434/262 |
| 6,346,940 | B1 * | 2/2002 | Fukunaga | 345/427 |
| 6,909,436 | B1 * | 6/2005 | Pianykh et al. | 345/619 |
| 2003/0160787 | A1 * | 8/2003 | Buehler | 345/421 |
| 2003/0167159 | A1 * | 9/2003 | Goddard et al. | 703/12 |
| 2005/0047648 | A1 * | 3/2005 | Newman et al. | 382/162 |
| 2005/0248567 | A1 * | 11/2005 | Kim | 345/419 |
| 2006/0217947 | A1 * | 9/2006 | Castanon Fernandez | 703/10 |

OTHER PUBLICATIONS

Zauhar et al. Shape signatures: A New Approach to Computer-Aided Ligand- and Receptor-Based Drug Design. Journal of Medicinal Chemistry. vol. 46. 2003. p. 5674-5690.*

(Continued)

*Primary Examiner*—Ulka Chauhan
*Assistant Examiner*—Peter-Anthony Pappas
(74) *Attorney, Agent, or Firm*—RatnerPrestia

(57) ABSTRACT

A method for computing surface descriptors for a closed surface, which are each encoded with a property of the closed surface. A triangulated model of the closed surface is provided that includes a number of triangles. A number of random points within the closed surface are selected. A set of surface descriptors originated from each of the plurality of random points are generated, in parallel, using a ray bouncing algorithm. Each surface descriptor is determined using: a ray length of a ray traced by the ray bouncing algorithm; and an estimated property value at the point of intersection. The estimated property value is calculated using property values corresponding to the vertices of the intersected triangle. It is determined whether a distribution of the sets of surface descriptors converge using a convergence algorithm. The ray bouncing and convergence algorithms are repeated until this distribution is determined to converge.

42 Claims, 12 Drawing Sheets
(5 of 12 Drawing Sheet(s) Filed in Color)

OTHER PUBLICATIONS

Breneman et al. New Developments in PEST Shape/Property Hybrid Descriptors. Journal of Computer-Aided Molecular Design. vol. 17. 2004. p. 231-240.*

Zauhar, Randy J. Smart: A Solvent-Accessible Triangulated Surface Generator for Molecular Graphics and Boundary Element Applications. Journal of Computer-Aided Molecular Design. vol. 9. 1995. p. 149-159.*

Foley et al. Computer Graphics: Principles and Practice. Addison-Wesley Publishing Company, Inc. 1997. p. 548-557.*

Zauhar et al. Shape Signatures, a New Approach to Computer-Aided□□Ligand- and Receptor-Based Drug Design. Sep. 10, 2003. http://web.archive.org/web/20030910035834/http://tonga.usip.edu/zauhar/shape_sig.html.*

Foley et al. Computer Graphics: Principles and Practice. Addison-Wesley Publishing Company, Inc. 1997. pp. 873-876.*

Ewing et al. DOCK 4.0: Search Strategies for Automated Molecular Docking of Flexible Molecule Databases. Journal of Computer-Aided Molecular Design. vol. 15. No. 5. May 2001. pp. 411-428.*

Zauhar. Application of Shape Signatures to the Identification of Estrogenic Compounds. May 2001. http://tonga.usip.edu/zauhar/Dayton_HTML/index.htm.*

Zuahar. Project DDASSL □g Design And Semi-Supervised Learning (NSF/KDD IIS-9979860). May 2001. http://tonga.usip.edu/zauhar/Matt_Sundling_ACS/index.htm.*

Zauhar. 㿂rface Signatures柯 a New Approach for Fast Database Screening and Docking. May 2001. http://tonga.usip.edu/zauhar/New_Orleans_HTML/index.htm.*

Ewing. DOCK 4.0—User Manual. 1998.*

DesJarlais et al. Using Shape Complementarity as an Initial Screen in Designing Ligands for a Receptor Binding Site of Known Three-Dimensional Structure. Journal of Medicinal Chemistry. 1988.*

Boulu et al. Voronoi Binding Site Models—Calculation of Binding Modes and Influence of Drug Binding Data Accuracy. Journal of Computational Chemisty. vol. 10. No. 5. 1989.*

Boulu et al. Voronoi Binding Site Model of a Polycyclic Aromatic Hydrocarbon Binding Protein. Journal of Medicinal Chemistry. 1990.*

Wei et al. A Model Binding Site for Testing Scoring Functions in Molecular Docking. Journal of Molecular Biology. vol. 322. Issue 2. Sep. 2002.*

Muegge et al. Small Molecule Docking and Scoring. Reviews on Computational Chemistry. vol. 17. 2001.*

* cited by examiner

SYSTEM AND METHOD OF COMPUTING AND DISPLAYING PROPERTY-ENCODED SURFACE TRANSLATOR DESCRIPTORS

This application is related to and claims the benefit of U.S. Provisional Application No. 60/506,661 entitled METHOD OF COMPUTING PROPERTY-ENCODED SURFACE TRANSLATOR DESCRIPTORS filed on Sep. 26, 2003, herein incorporated by reference.

The U.S. Government has a paid-up license in this invention and the right in limited circumstances to require the patent owner to license others on reasonable terms as provided for by the terms of Contract No.'s IIS-9979860, BES-0419413, BES-0214183, BES-0079436 awarded by the National Science Foundation (NSF) and Contract No. R01 GM047372-07 awarded by the National Institute of Health (NIH).

FIELD OF THE INVENTION

The present invention relates to computing surface descriptors that have been encoded with various surface properties. More specifically it is relevant to computational chemistry and the computation of encoded molecular surface descriptors.

BACKGROUND OF THE INVENTION

The analysis of surface properties can be an important approach to understanding interactions between objects. The interaction between a solid object and external, and/or internal, forces may be greatly effected by surface properties. For example, failure of a material often begins on the surface, especially at edges or vertices. Interactions on the surfaces of bodily organs may provide insights into the functioning of these organs, potentially allowing important diagnostic information. Surface properties of various isosurfaces of fields, such as magnetic potential isosurfaces in a magnetic containment system, may provide important details as well.

One of the most exciting areas in which the analysis of surface properties may find application is in the area of computational chemistry. Analysis of the surface properties of molecules may allow chemists to reduce the complexity of some problems involving characterization of molecules and interactions between molecules.

One approach to the process of calculating molecular surface properties and shapes starts with a mathematical description of a molecule's shape and surface from an electron-density-derived/transferable atom equivalent data file or other property-encoded surface file. Transferable Atom Equivalents (TAEs) are a library of atomic charge density distributions and their properties that can be combined using the RECON program to provide for rapid retrieval of atomic charge density fragments and molecular assembly. Each atomic charge density fragment in the library is associated with a surface file and a data file. The surface file is a numerical representation of the 3-dimensional shape of the atomic charge density, and includes a set of electronic surface properties.

Transferable Atom Equivalent (TAE) descriptors encode the distributions of electron density based molecular properties, such as electronic kinetic energy densities, local average ionization potentials, electrostatic potentials, Fukui functions, electron density gradients and second derivatives, in addition to the density itself. Table 1 shows a complete list of TAE descriptors.

TABLE 1

Electron-density-derived TAE descriptors. $\rho(r)$ represents the electron density distribution.

| Integrated Electronic Properties | | |
|---|---|---|
| Energy | | |
| Electron population | | |
| Volume | | |
| Surface | | |
| Surface electronic properties (extrema, surface integral averages and histogram bins are available for each properties) | | |
| SIEP | Surface integral of electrostatic potential | |
| EP | Electrostatic potential | $EP(r) = \sum_\alpha \frac{Z_\alpha}{|r - R_\alpha|} - \int \frac{\rho(r^2)dr^2}{|r - r^2|}$ |
| DRN | Electron density gradient normal to 0.002 e/au$^3$ electron density iso surface | $\nabla \rho \cdot n$ |
| G | Electronic kinetic energy density | $G(r) = -(1/2)(\nabla \psi^* \cdot \nabla \psi)$ |
| K | Electronic kinetic energy density | $K(r) = -(1/2)(\psi^* \nabla^2 \psi + \psi \nabla^2 \psi^*)$ |
| DGM | Gradient of the K electronic kinetic energy density normal to surface | $\nabla K \cdot n$ |
| DGN | Gradient of the G electronic kinetic energy density normal to surface | $\nabla G \cdot n$ |
| F | Fukui F$^+$ function scalar value | $F+(r) = \rho_{HOMO}(r)$ |
| L | Laplacian of the electron density | $L(r) = -\nabla^2 \rho(r) = K(r) - G(r)$ |

TABLE 1-continued

Electron-density-derived TAE descriptors. $\rho(r)$ represents the electron density distribution.

| | | |
|---|---|---|
| BNP | Bare nuclear potential | $$BNP(r) = \sum_\alpha \frac{Z_\alpha}{|r - R_\alpha|}$$ |
| PIP | Local average ionization potential | $$PIP(r) = \sum_i \frac{\rho_i(r)|\varepsilon_i|}{\rho(r)}$$ |

The TAE data files contain information describing topological features of the atomic charge density, and are used to orient the fragments into their proper molecular space orientations. The data files also contain atomic charge density-based descriptors which encode electronic and structural information relevant to the chemistry of intermolecular interactions, such as the van der Waals surface.

In practice, when calculating TAE data files, the external atomic surfaces are truncated where the electron density reaches 0.002 electrons per cubic Bohr. This serves to keep the atoms finite and roughly corresponds to the condensed phase van der Waals surface of the atoms in a molecular environment.

These TAE descriptors generally generate high quality models. TAE descriptors, however, are non-orthogonal, therefore traditional regression analysis (such as multiple regression analysis) is not appropriate, as the system can become over-determined. Modeling techniques such as principal component analysis, artificial neural networks (M. J. Embrechts, et al., COMPUTATIONALLY INTELLIGENT DATA MINING FOR AUTOMATED DESIGN AND DISCOVERY OF NOVEL PHARMACEUTICAL IN SMART ENGINEERING SYSTEMS: NEURAL NETWORKS, FUZZY LOGIC, EVOLUTIONARY PROGRAMMING, DATA MINING AND ROUGH SETS, ASME Press (1998); Kewley, et al., NEURAL NETWORK ANALYSIS FOR DATA STRIP MINING PROBLEMS, in INTELLIGENT ENGINEERING SYSTEMS THROUGH ARTIFICIAL NEURAL NETWORKS, ASME Press, pgs. 391-396 (1998)), kernel partial least squares regression or SupportVectorMachine (SVM) regression, can be fruitfully employed on such data, with feature selection accomplished using genetic algorithms or sensitivity analysis, as described by M. J. Embrechts et al. in BAGGING NEURAL NETWORK SENSITIVITY ANALYSIS FOR FEATURE REDUCTION IN QSAR PROBLEMS (2001 INNS—IEEE International Joint Conference on Neural Networks (2001)). Some of these routines are incorporated in the StripMiner™ software package.

RECON is another algorithm for the rapid reconstruction of molecular charge densities and charge-density based electronic properties of molecules that can be used in place of or in conjunction with TAE descriptors derived from ab initio or semi-empirical wave functions. RECON uses a library of atomic charge density fragments and is based on the quantum theory of atoms in molecules. This algorithm was developed at Rensselear Polytechnic Institute.

In recent years, wavelet encoding has gained popularity in diverse applications as an efficient means of data compression and pattern recognition. The wavelet basis has advantages over the Fourier basis in that, while the trigonometric functions used in Fourier expansion are monochromatic in frequency but entirely delocalized in position, the wavelet basis is well localized in both frequency and position. Wavelet encoding and decoding are accomplished by a simple scaling and dilation algorithm.

The Discrete Wavelet Transform (DWT) is a fast linear operation on a data vector with length 2n (where n is an integer) that transforms the original data vector into a wavelet coefficient vector of the same length. The resulting vector consists of 2n–1 scaling coefficients and 2n–1 detail coefficients. The former represent a smoothed envelope of the data, while the latter give the detailed deviations from this smoothed function. The scaling coefficient vector can, in turn, be subjected to another round of DWT, resulting in 2n–2 scaling coefficients and 2n–2 detail coefficients, encoding a finer level of detail. For a data vector of length 2n the DWT can be performed n–1 times, resulting in a single scaling coefficient and 2n–1 detail coefficients. This entire procedure can be reversed in the same iterative manner to decode the wavelet coefficient vector, reconstructing the original signal. Since molecular surface property distributions are smoothly varying functions in property space, it is reasonable to expect that the important physicochemical information relevant to intermolecular interactions will be contained in the scaling and first few levels of detail coefficients, rather than in the finer levels of detail. Discarding the finer levels of detail coefficients therefore results in significant data compression with little loss of signal. In RECON, each of the ten surface electronic properties in Table 1 is represented by a 1024-point distribution and encoded in the symmlet-8 wavelet basis, retaining only 32 wavelet coefficients. Property distributions reconstructed from these 32 wavelet coefficients reproduce the original distributions to greater than 95% accuracy.

TAE WCD's generated from ab initio quantum computations have been employed with success, in conjunction with other TAE and traditional descriptors, to model a variety of chemical and biochemical phenomena. Since ab initio quantum chemical descriptors are laborious to compute and impracticable to implement in high-throughput mode, it is of considerable value to obtain these WCD descriptors through the RECON method. Just as for other TAE descriptors, wavelet coefficients of atomic property distributions (WCD) can be simply summed (weighted by the atomic surface area) to give molecular wavelet representations, from which approximate distributions in property space can be reconstructed, if desired. This has been implemented in Beta version 6.3 of RECON and the atomic wavelet library is presently being constructed.

SUMMARY OF THE INVENTION

Exemplary embodiments of the present invention include a method and a computer readable medium adapted to instruct a general purpose computer for computing surface descriptors for a closed surface, which are each encoded with a property of the closed surface. A triangulated model of the closed surface is provided that includes a number of triangles. Each triangle has: three vertices, with corresponding property values of the property; three edges connecting pairs of the vertices; and a planar surface bounded by the edges. A number of random points within the closed surface are selected. A set of surface descriptors originated from each of the plurality of random points are generated, in parallel, using a ray bouncing algorithm. Each surface descriptor is determined using: a ray length of a ray traced by the ray bouncing algorithm; and an estimated property value at the point of intersection between the traced ray and the intersected planar surface of an intersected triangle. The estimated property value is calculated using the corresponding property values at the three vertices of the intersected triangle. It is determined whether a distribution of the sets of surface descriptors converge using a convergence algorithm, such as a Markov-chain Monte-Carlo convergence algorithm. The ray bouncing and convergence algorithms are repeated until the distribution of the surface descriptors are determined to converge.

Other exemplary embodiments of the present invention include a method and a computer readable medium adapted to instruct a general purpose computer for computing surface descriptors to score the binding of a first molecule to a second molecule. Each surface descriptor is encoded with a property of either the first molecular surface or the second molecular surface. A first triangulated model of the first molecular surface, including a first plurality of triangles is provided and a second triangulated model of the second molecular surface including a second plurality of triangles is provided. Each triangle has: three vertices, with corresponding property values of the property; three edges connecting pairs of the vertices; and a planar surface bounded by the edges. A binding site on the second molecular surface is identified and located using the second triangulated model. The first molecule is docked in a docked position, or pose, in the binding site of the second molecular surface using the first triangulated model and the second triangulated model. A binding space between the first molecular surface and the second molecular surface is identified using the first triangulated model, the second triangulated model, and the docked position (or pose) of the first molecule. A random point is selected within the binding space and the surface descriptors originating from the random point are generated using a ray bouncing algorithm. Each surface descriptor is determined using: a ray length of a corresponding ray traced by the ray bouncing algorithm; and an estimated property value at the point of intersection between the corresponding ray and the intersected planar surface of the intersected triangle. The estimated property value is calculated using the corresponding property values of the property at the three vertices of the intersected triangle. The binding of the first molecule to the second molecule is scored using the plurality of surface descriptors generated in the ray bouncing algorithm.

An additional exemplary embodiment of the present invention is an apparatus for computing surface descriptors that are encoded with properties of a surface. The apparatus includes: triangulation means to calculate a triangulated model of the closed surface that includes a plurality of triangles; random point selection means to select a number of random points within the closed surface; a parallel processor to generate, in parallel, a set of surface descriptors originated from each of the plurality of random points using a ray bouncing algorithm; and a convergence processor to determine when a distribution of the plurality of sets of surface descriptors converges. Each triangle has: three vertices, with corresponding property values of the property; three edges connecting pairs of the vertices; and a planar surface bounded by the edges. Each processor of the parallel processor determines a surface descriptor using: a ray length of a corresponding ray traced by the ray bouncing algorithm; and an estimated property value at the point of intersection between the corresponding ray and the intersected planar surface of the intersected triangle. The estimated property value is calculated using the corresponding property values of the property at the three vertices of the intersected triangle.

A further exemplary embodiment of the present invention is an apparatus for computing a plurality of surface descriptors to score binding of a first molecule to a second molecule. Each surface descriptor is encoded with a property of either the first molecular surface or the second molecular surface. The apparatus includes: triangulation means to calculate a first triangulated model of the first molecular surface including a first plurality of triangles and a second triangulated model of the second molecular surface including a second plurality of triangles; binding site location means to identify and locate a binding site on the second molecular surface using the second triangulated model; docking means to dock the first molecule in a docked position, or pose, in the binding site of the second molecular surface using the first triangulated model and the second triangulated model; binding space identification means to identify a binding space between the first molecular surface and the second molecular surface using the first triangulated model, the second triangulated model, and the docked position (or pose) of the first molecule; random point selection means to select a random point within the binding space; a processor to generate the plurality of surface descriptors originated from the random point using a ray bouncing algorithm; and scoring means to score the binding of the first molecule to the second molecule using the plurality of surface descriptors. Each triangle has: three vertices, with corresponding property values of the property; three edges connecting pairs of the vertices; and a planar surface bounded by the edges. The processor determines each surface descriptor using: a ray length of a corresponding ray traced by the ray bouncing algorithm; and an estimated property value at the point of intersection between the corresponding ray and the intersected planar surface of the intersected triangle. The estimated property value is calculated using the corresponding property values of the property at the three vertices of the intersected triangle.

BRIEF DESCRIPTION OF THE DRAWINGS

The patent or patent application file contains at least one drawing executed in color. Copies of this patent or patent application publication with color drawing(s) will be provided by the Patent and Trademark Office upon request and payment of necessary fee.

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

Figure 1:
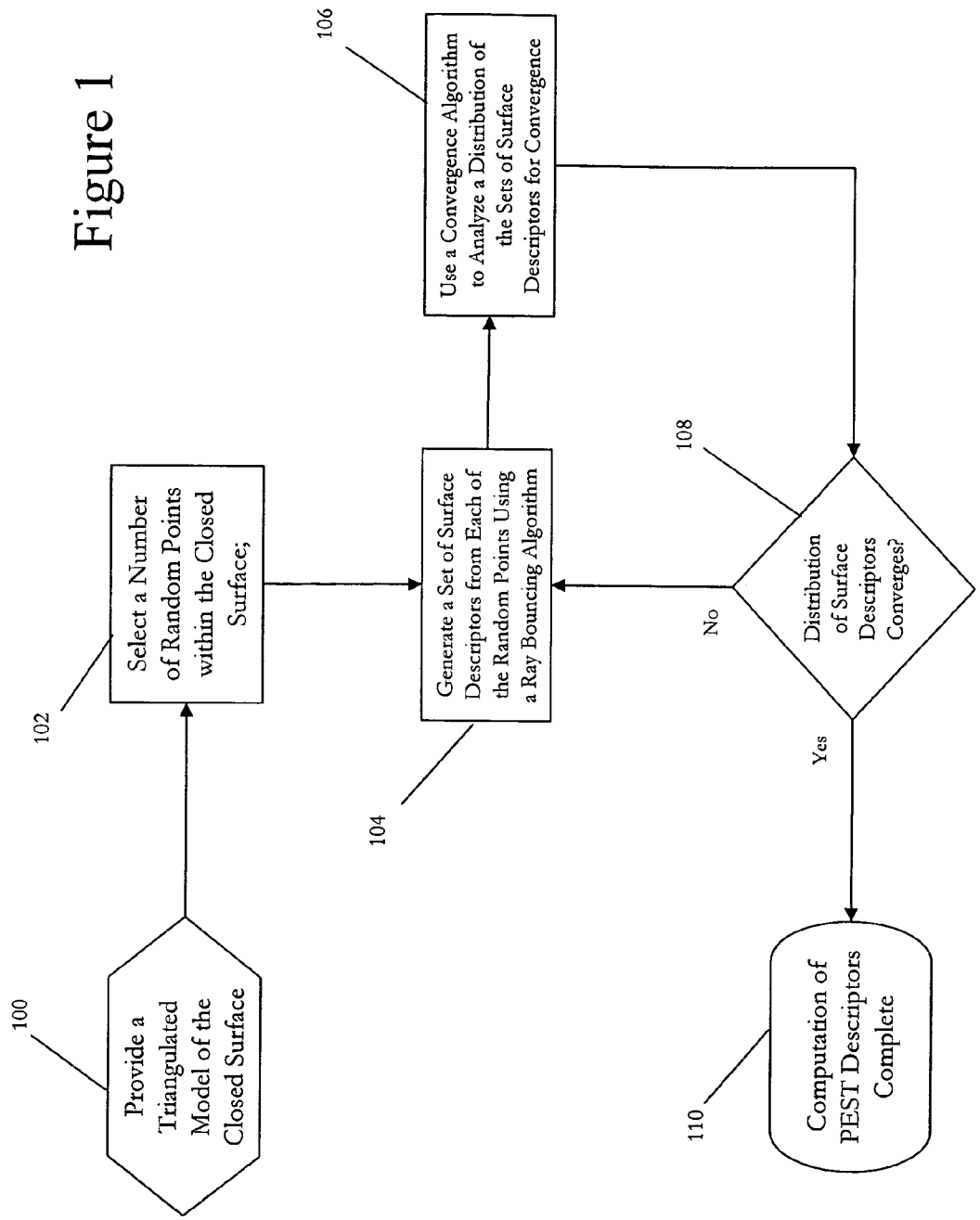
FIG. 1 is a flow chart illustrating the main components of an exemplary method of calculating property encoded surface translator (PEST) descriptors according to the present invention.

The present invention involves the calculation, use, and display of property encoded surface translator (PEST) descriptors for surfaces. These PEST descriptors may provide a powerful tool for analyzing a variety of closed surfaces including: a molecular surface, such as an electron density isosurface, the van der Waals surface, or the Connolly surface of a molecule; a field potential isosurface of an electric, magnetic, acoustic, gravitational, quantum mechanical, or other field; and a surface of a bodily organ or other solid object. PEST descriptors may also be used to analyze interactions between surfaces separated by an open space. For example, PEST descriptors may be useful in analyzing and scoring the binding of molecules into binding sites of other molecules.

It is noted that many exemplary features of the present invention are illustrated in terms of the analysis of molecular surfaces. These illustrations are intended to be illustrative of the particularly powerful use of PEST descriptors for computational chemical analysis and are not intended to be limiting. It is contemplated that one skilled in the art may understand the application of these illustrated features to the analyses of other surfaces.

One exemplary embodiment of the present invention is a PEST descriptor generation method that provides a synergy between Transferable Atom Equivalent (TAE) technology and the concept of "Shape Signatures" developed by R. J. Zauhar. Zauhar's Shape Signatures use optical ray tracing within a hard-sphere van der Waals surface based molecular envelope. The PEST methodology is significantly different from the shape signatures approach in that it may utilize TAE and RECON electron density-derived molecular surface envelopes to encode each reflected ray with one of ten, or more, electronic properties encoded on the surface. The resulting surfaces and rays are then used in several ways to produce molecular property descriptors useful for molecular design and screening applications, as well as QSAR and QSPR model building, as well as similarity comparisons and molecular reactivity models. Descriptors produced in this way include surface property histograms, surface property wavelet coefficients, and shape/property hybrid descriptors.

Shape and property hybrid descriptors in combination with 2D topological descriptors may increase the predictive capability of QSAR and QSPR models. PEST descriptors may be computed using ab initio or semi-empirical electron density surfaces and/or electronic properties, as well as atomic fragment-based TAE/RECON property-encoded surface reconstructions. The RECON and PEST algorithms also include rapid fragment-based wavelet coefficient descriptor (WCD) computation. These descriptors enable a compact encoding of chemical information.

It is noted that earlier uses of TAE descriptors entirely ignore the three dimensional spatial information of the isosurface from the electron density calculations. Exemplary TAE/PEST hybrid shape-property descriptors of the present invention retain shape information about the molecular surface, and use the shape information to represent molecular properties. This process provides a ray-to-surface intersection detection method derived from the ray-tracing technique of computational geometry and graphics and regular light reflection mathematics.

FIG. 1 is a flowchart that illustrates an exemplary method for computing surface descriptors for a closed surface, where each surface descriptor is encoded with a property of the closed surface. Surface descriptors for any closed surface for which analysis of surface properties is desired, such as molecular surfaces, field potential isosurfaces, the surface of bodily organs, or the surface of other solid objects, may be computed using the exemplary method of FIG. 1. The property, or properties, for which the surface descriptors are encoded depends on the type of surface and the desired information to be represented by the descriptors.

For example, properties that may be encoded within the surface descriptors include: for molecular surfaces, surface integrals of electrostatic potential, electrostatic potentials, electron density gradients normal to the molecular surface, electronic kinetic energy densities, gradients of electronic kinetic energy densities normal to the molecular surface, Fukui F+ function scalar values, Laplacians of the electron density, bare nuclear potentials, local average ionization potentials, Politzer ionization potentials, and surface integrals of kinetic energy; for field potential isosurfaces, field strengths, field strengths normal to the field potential isosurface, surface integrals of field strength, field energy densities, gradients of the field energy density normal to the field potential isosurface, field energy current densities normal to the field potential isosurface, current densities of a component of the field momentum density, gradients of the field potential normal to the field potential isosurface, components of the field tensor, divergences of the field, and curls of the field; for surfaces of solids, curvatures of the surface, pressures normal to the surface, components of stress, components of strain, components of shear, compressions, tensions, deformations, and fluxes through the surface; for surfaces of bodily organs, blood flows parallel to the surface, blood flows through the surface, electrical activities, fluxes of chemicals through the surface, and temperatures. The property to be encoded in the PEST descriptors may also be a function of one or more other surface properties.

Figure 2:
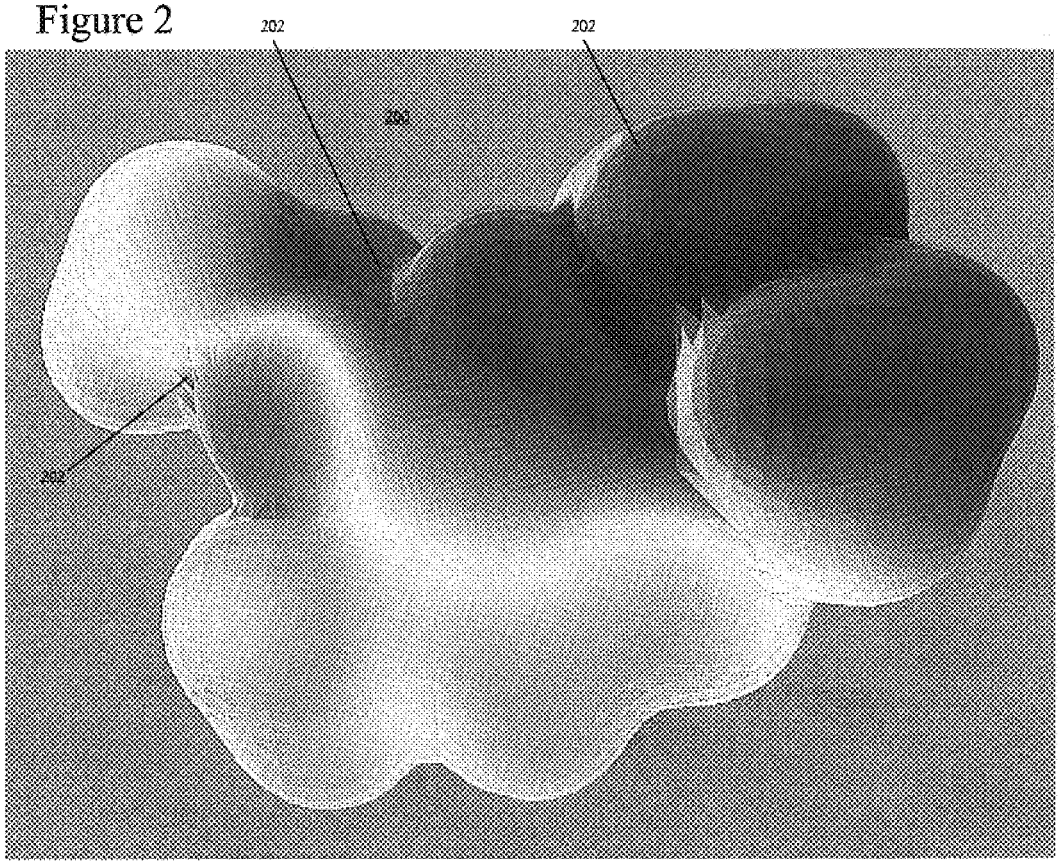
FIG. 2 is a front perspective drawing (provided in color and greyscale) illustrating an exemplary triangulated model of a molecular surface that may be used with the exemplary method of FIG. 1.

The exemplary method of FIG. 1 begins with a triangulated model of the closed surface including a number of triangles, step 100. FIG. 2 illustrates an exemplary triangulated model 200 which includes a large number of triangles 202. Each of the triangles has three vertices and three edges connecting pairs of the vertices. The three edges bound a planar surface. In the triangulated model, property values are calculated for each vertex. Each vertex has a corresponding property value for each property to be analyzed. Note that in FIG. 2 the planar surfaces of triangles 202 are shown in false color to represent the value of a surface property associated with the triangles. These false colors are based on an interpolation of the vertex property values.

The triangulated model may be generated using various methods based on the surface being analyzed. Computer assisted drafting images or wireframe models may be used for solid surfaces. Exemplary molecular surfaces may be generated by various quantum chemical calculations. These calculations may be desirably performed on a general purpose computer programmed to generate the desired triangulated model, but the calculations may also be performed using a special purpose processor designed to perform this task.

The triangulated model of the molecular surface may represent any of a number of molecular surface models, such as an electron density isosurface of the molecule (typically selected in the range of about 0.001 e/Å3 to 0.005 e/Å3), a van der Waals surface of the molecule, or a Connolly surface of the molecule. Any encoded surface would suffice for the PEST algorithm to function.

Exemplary calculations available for generating a molecular surface may include: empirical hard-sphere or Lennard-Jones potential calculations; ab initio quantum mechanics-based electron density surface calculations, or electronic properties calculations; semi-empirical electron density surface or electronic properties calculations; or atomic fragment-based transferable atom equivalents (TAE) property-encoded surface reconstructions; quantitative structure-activity relationships (QSAR), quantitative structure-property relationships (QSPR). It is noted that traditional QSAR methods are successfully employed primarily within homologous sets of molecules. The descriptors representing simple molecular properties provide intuitive insight into the physicochemical nature of the activity/property under consideration; however other descriptors that correlate with less clearly defined intermolecular interactions can often lead to models with greater predictive power.

The surface area of the planar surface of each triangle in the triangulated model is desirably selected such that a maximum variation of the property on any of the planar surfaces is less than a predetermined fraction of an average property value. Thus, both the triangle size and the number of triangles making up the triangulated model may vary depending on the 'roughness' of the surface property, or properties, being evaluated. Finer triangulations may provide information of fine surface details, but may also provide an excess of data. For example, QSAR calculations may become over defined and lose accuracy if the data set is increased. For a molecular surface, the surface area of the triangle planar surfaces is generally less than about 1 Å$^2$, and is desirably in the range of about 0.1 Å$^2$ to 0.5 Å$^2$.

Figure 3:
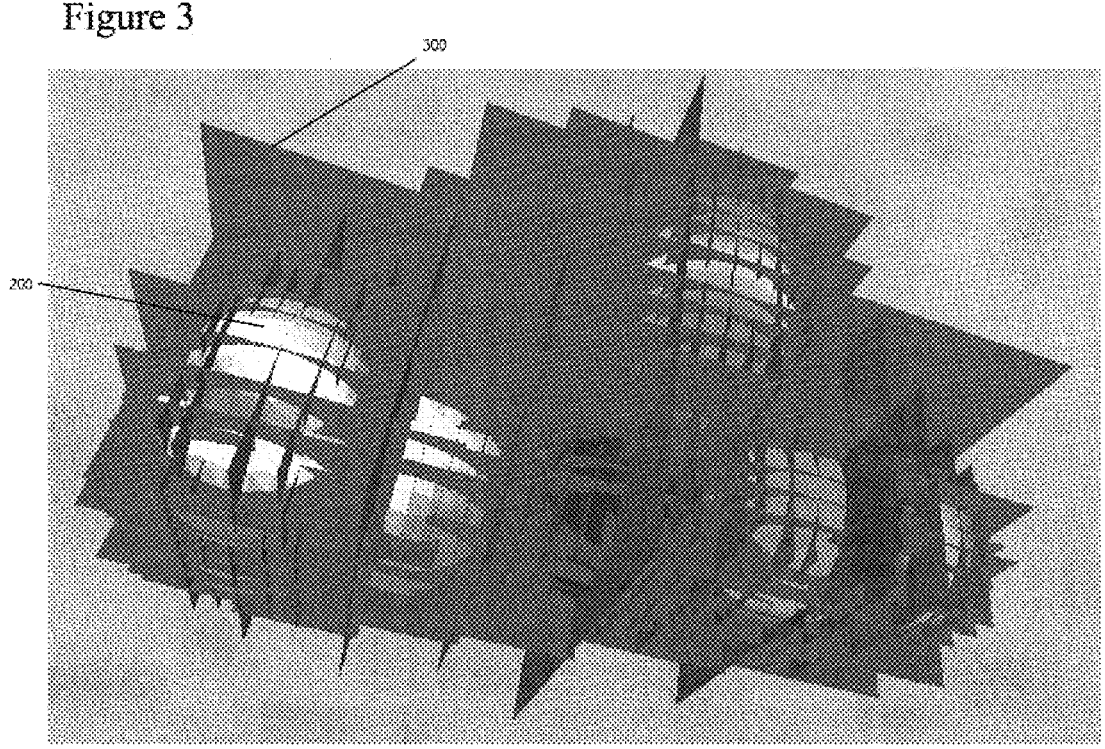
FIG. 3 is a top perspective drawing (provided in color and greyscale) illustrating an exemplary space partitioning of a triangulated molecular surface that may be used with the exemplary method of FIG. 1.

For improved speed in the ray bouncing algorithm it is desirable for the triangles of the triangulated model to be organized using a space partitioning tree. The use of a space partition tree allow rapid look up of various area of the modeled space to identify triangles that are along a ray path. Binary space partitioning (BSP) trees and octrees are well known space partition tree structures. FIG. 3 illustrates the exemplary division of triangulated molecular surface 200 by a plurality of partitions 300. This Figure graphically illustrates how a space partition tree separates the triangles of the triangulated model into spatially localized subsets allowing more rapid searching through the triangles. The space partitioning tree may partition the triangles using three sets of orthogonal axes as shown in FIG. 3. Alternatively, the space partitioning tree may desirably partition the triangles using one or more axes, which are not necessarily orthogonal, selected to substantially evenly divide the closed surface.

After the triangulated model of the closed surface is generated, it is provided to a parallel processing unit to continue the PEST descriptor computation. This parallel processing unit may be the same computer or processor used in step 100 or it may be a separate computer capable of multi-thread operation, and programmed with appropriate software, or another special purpose processor. A number of random points are selected within the closed surface, step 102. Each random point is selected by one of the parallel processing units and used by that parallel processing unit to generate a set of surface descriptors. Each of the random points may be tested by a simple heuristic to ensure that it is within the closed surface.

The triangulated isosurfaces may not be closed or well-behaved in all cases, therefore specific heuristics may be employed for determining an appropriate starting point and initial direction vector for an isosurface. One method includes the following steps, for example, (1) randomly selecting a trial point suspected of being inside the surface, (2) propagating N random rays from that point, (3) determining the number of triangles of the triangulated model intersected by each ray, and (4) evaluating the rays to determine if a desired majority (e.g. greater then 95%) of the rays intersect the surface an odd number of times. This may be done by counting trial rays for which the number of triangles intersected is odd until either all rays have checked or a predetermined number of rays with an odd number of intersections are reached. If the majority of the rays do intersect the surface an odd number of times, then the suspected point is an interior point. If the less than the predetermined number of the rays intersect the surface an odd number of times, these steps are repeated until an interior point is found.

Figure 4:
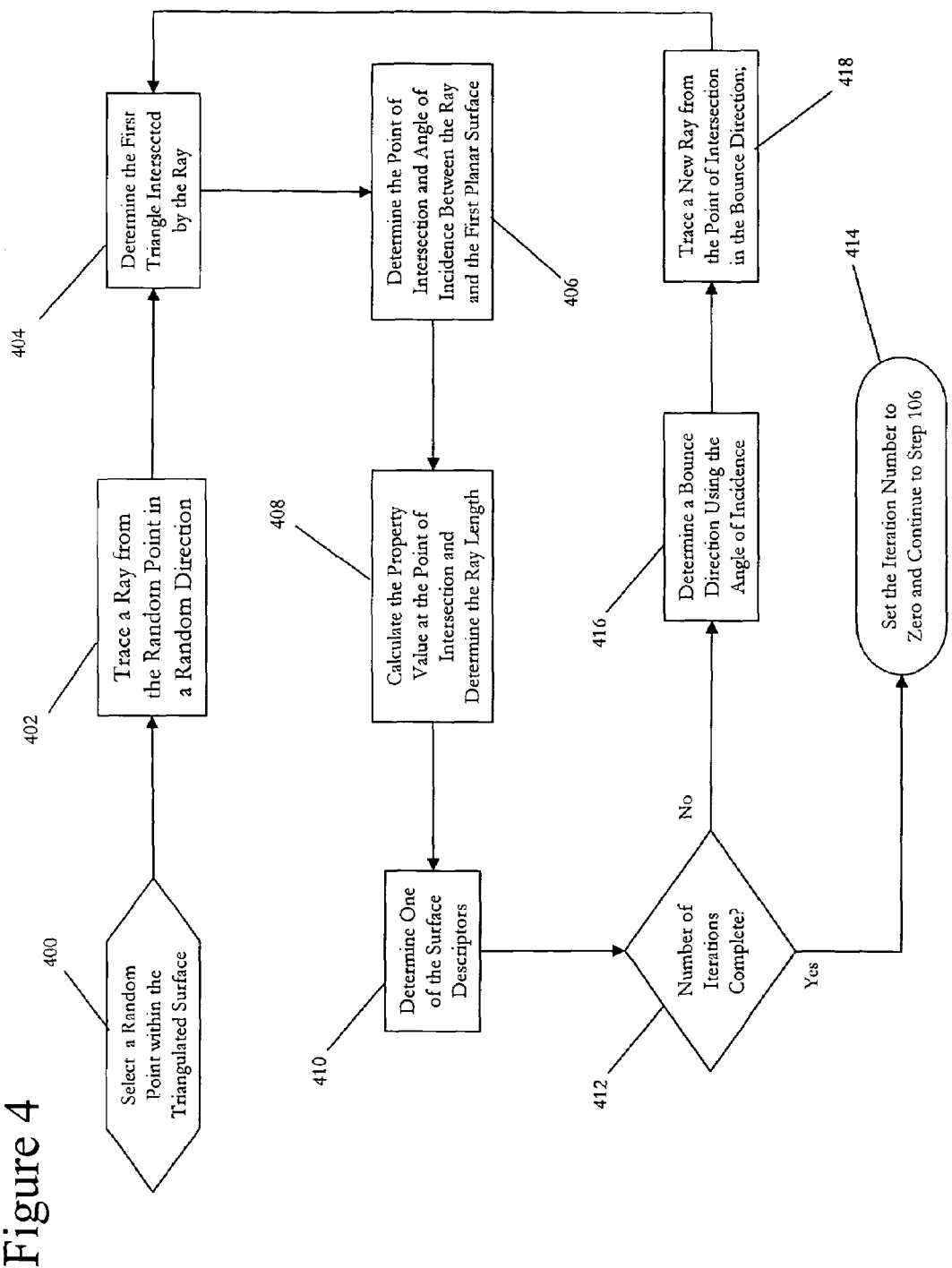
FIG. 4 is a flow chart illustrating an exemplary ray bouncing algorithm that may be used with the exemplary method of FIG. 1.

A set of surface descriptors which originate from each of the plurality of random points is generated, in parallel, using a ray bouncing algorithm, step 104. FIG. 4 illustrates an exemplary ray bouncing algorithm for a ray originated from a single one of the random points selected in step 102. This algorithm may be used in parallel by the multiple processors in the parallel processing unit to perform step 104 of the exemplary method of FIG. 1. The exemplary method of FIG. 4 begins with the selection of the random point within the triangulated surface, step 400.

A random direction vector starting from the selected random point is chosen and a ray is traced from the point in this direction, step 402. The first intersection between the ray path of the traced ray and a planar surface of a triangle of the closed surface is determined, step 404.

Once the point and direction have been determined, the path of this vector is followed until it strikes the inside surface of the molecule. Propagating a vector to determine its intersections with a surface can be restated as searching for the triangles of the surface that the line of the vector intersects. In computational geometry, this operation is termed ray/triangle-intersection search or ray tracing, and may be rather complex. The complexity of the problem stems from the brute force method of testing every triangle in the surface for a positive intersection, as this is computationally intensive. Algorithms, usually based on partitioning three dimensional spaces into successively smaller regions that encase different portions of the surface triangles themselves, allow for quick, intelligent triangle lookups, which drastically reduces the total number of ray/triangle tests performed. Using a hierarchical tree structure to capture the spatial relationships of the different regions allows quick ray-intersection testing of an entire region of space. If a ray does not pass through a large portion of space, then it cannot pass through the smaller portions of space (or their culled triangles) contained therein. This notion of testing successively finer-grain portions of space allow the triangle search to be significantly accelerated, without loss of accuracy in detection of intersections.

One exemplary approach to increase the speed of this search is to use a space partitioning tree. If the triangles in the triangulated model of the closed surface are organized using a space partitioning tree, the tree structure may be used to identify non-intersected spaces partitioned by the space partitioning tree. Triangles that are in these non-intersected spaces may then be culled from the search and only the non-culled triangles searched to determine which triangles are intersected by the ray path of the ray.

If only one triangle is found along the ray path, this triangle is the first intersected. If more than one triangle is found to lie along the ray path, then the ray may be traced to determine which of the intersected triangles is the first triangle intersected by the ray.

If no triangles are found along the ray path, this may indicate that the triangulated model has a flaw or a missing triangle. Alternatively, the lack of an intersected triangle may indicate that the ray path has struck an edge or vertex of the triangulated model and 'leaked' out through this edge or vertex. The leaked ray may be detected and corrected by the addition of a random, slight perturbation of the original ray direction, moving its path away from the edge of a triangle. This does not greatly affect the ray-bouncing path and offers a simple solution to avoid the pitfalls of more complex correction heuristics. To avoid situations where the ray-bouncing path is 'stuck' in some sort of loop or repeated sequence, a periodic random perturbation to the direction vector may be added after a predetermined number of bounces. In addition, to avoid the ray-bouncing path getting stuck in one portion of the molecule's volume, periodic termination and random restarts of the bouncing path may be inserted into the algorithm's loop. One advantage of the exemplary methods of the present invention is that the break in the path does not affect the overall computation of the surface descriptors or their performance in QSAR or related learning tasks.

Openings in a surface, due to a 'poor' triangulation or otherwise, may allow a ray-bouncing path to eventually bounce to the outside of the molecule. Even in the case of a missing triangle, it may be possible to 'save' the ray by adding a random angular perturbation to the ray path and searching the triangles for intersection along this new path.

After a predetermined number of unsuccessful iterations of perturbing the ray, it may be determined that the ray has escaped the closed surface through a triangulation error and can not be simply 'saved.' A new random point within the closed surface may be selected.

An alternatively embodiment of the present invention deals with this situation by detecting the escaped ray (by culling the theoretical molecular space by an 'infinite' boundary, and detecting ray/intersections with it), ending the ray/bounce path, and beginning a new path from within the interior according to the original algorithm specified above.

The point of intersection and the angle of incidence between the ray and the first planar surface are determined, step 406. Each ray/triangle intersection test is a trivial linear algebra problem, that of determining if (1) a solution exists that satisfies the plane equation for the planar surface of the triangle and the line equation of the ray, and (2) if that solution exists in the interior of the triangle.

A potential difficulty with computing a point of intersection (assuming it exists) stems from the imprecision of the computer data types used in the computation. When the point of intersection is computed using standard imprecise data types, it may contain a round off error—in essence, this point may be outside the plane of the triangle. More specifically, the point may have been rounded out of the closed surface, such that the ray-bounce path has escaped the closed surface. One heuristic available is to reel the point back into the interior of the surface by taking minute steps in the opposite direction of the incident ray. This serves to march the point back into the interior of the closed surface along the path of the original vector. The true distance between points of intersection may be lost, but the error introduced is one the order of the potential round off error and, thus, may desirably be negligible.

One exemplary method of determining the angle of incidence involves the use of spherical coordinates. A spherical coordinate system may be defined which is centered on the estimated point of intersection and has the normal to the intersected planar surface as a pole. The angle of intersection is then calculated to be equal to the colatitude angle of the ray in this spherical coordinate system. Alternative methods known in ray tracing and computational geometry may be used to determine the angle of incidence as well.

Once the point of intersection and the angle of incidence are determined, the ray length and the estimated property value at the point of intersection may be calculated, step 408. The ray length may be simply calculated as the distance between the present point of intersection and the previous point of intersection.

The property value at the point of intersection may be estimated by averaging the corresponding property values of the property at the three vertices of the intersected triangle. This may be a simple average or it may involve weighting the values at the vertices by the distances from the vertices to the point of intersection. Alternatively, a smoothly varying function of the property may be formulated over the intersected planar surface which is consistent with the corresponding property values of the property at the three vertices of the intersected triangle. Property values corresponding to vertices adjacent to the three vertices of the intersected triangle may be used to formulate this smoothly varying function. The estimated property value at the point of intersection may then be calculated by substituting the coordinates of the point of intersection into the smoothly varying function.

One of the surface descriptors is determined, step 410. It is contemplated that more than one PEST descriptor representing a different aspect of the surface may be determined simultaneously during the ray bounce algorithm. Types of descriptors that may be determined include one dimensional descriptors and two dimensional descriptors.

One dimensional descriptors may desirably relate the ray length to a descriptor function based on the estimated property value calculated in step 408. Two dimensional descriptors may desirably relate the ray length, the angle of incidence, and a descriptor function based on the estimated property value. These descriptor functions may be based on the estimated property value and at least one of: the ray length; the angle of incidence; or a previous estimated property value corresponding to the previous point of intersection. Simple exemplary descriptor functions may include: just the estimated property value itself; the sum, difference, product, or average of the present estimated property value and the previous estimated property value, and the product of the estimated property value and the ray length and/or a trigonometric function of the angle of incidence.

Another exemplary descriptor function is a PEST autocorrelation descriptor (PAD) function, which is based on the estimated property value, the ray length, and a previous estimated property value corresponding to the previous point of intersection. The autocorrelation method has been employed in the field of structure-activity relationships. The general equation for autocorrelation is defined in Equation (1):

$$A(d) = a \sum_x P_x^b \times P_{x+d}^b \quad (1)$$

where A(d) is the autocorrelation component corresponding to a ray length d, P is the estimated property value associated with a point of intersection, x and x+d are points of intersection having distance between them less than or equal to d, a is a normalization coefficient, and b and c are weighting coefficients.

The advantages of using autocorrelation methods are that they are canonical and hence independent of the coordinates. Autocorrelation methods can represent the molecular geometry characters, while substantially reducing the input information. It is noted that rays may be binned based on ray length and the autocorrelation component, A(d), may also be calculated based on points of intersection from rays in the bin including d, rather than all rays with lengths less than or equal to d.

After determining the surface descriptor(s), an iteration counter is incremented and it is determined whether a predetermined convergence testing number of iterations have occurred, step 412. The predetermined convergence testing number may desirably be 1000 or greater. If the predetermined convergence testing number of iterations has occurred, the iteration number is reset to zero and the ray bouncing algorithm is halted to check for convergence, step 414. Otherwise, the intersection point becomes the "current" point, and a bounce direction is calculated from the angle of incidence, step 416. The reflection of the incident ray-path with the surface triangle is computed using normal 'light reflection' computations, giving the new direction of the ray-bounce path. It is noted that if a spherical coordinate system has been defined in step 406 the determination of the bounce direction may be trivial.

A ray is traced into the interior of the closed surface from the point of incidence along the bounce direction, step 416. The first triangle intersected by the new ray is found, step 404 and steps 406, 408, 410, and 412 repeated for a predetermined convergence testing number of bounces, after which the collected number of ray-bounces and points are summarized and used to test the convergence of the PEST descriptors.

It is desirable to perform the sequence of steps of the ray bouncing algorithm of FIG. 4 on each of the parallel processing units to obtain the number of bounces desired more rapidly. Additionally, the information summarized in the surface descriptors desirably creates a representation of the entire space enclosed by the closed surface, so a thorough exploration of the surface is necessary. The average surface-sampling density may provide a good metric to determine an algorithmic ending point. For example, around 10 points/Å² has proven to be sufficient to sample a test molecule. A better metric for determining the number bounces desired may be found through use of a convergence theory, for example by using Markov-chain Monte-Carlo convergence theory.

By comparing the results of a number of independently generated series, a convergence algorithm allows the convergence of the distribution of series to be determined to a predetermined level of confidence. In the exemplary method of FIG. 1, a convergence processor may be used to the convergence of the distribution of sets of surface descriptors generated by the parallel processing units, step 106. Based on this analysis, it is determined whether the distribution of sets of PEST descriptors converges, within the desired level of confidence, step 108. It is noted that a distribution of ten sets of surface descriptors may provide a sufficient level of confidence in the convergence, but a distribution of 30 sets may provide a more desirable, approximately 5σ, level of confidence.

If the surface descriptors are determined to have converged, the computation is complete, step 110. Otherwise, the ray bouncing algorithm of step 104 is repeated and convergence tested again, until convergence is found.

For best results in similarity comparisons, all surfaces that are to be compared are preferably sampled similarly. This practice allows direct comparison of their resulting surface descriptors. The dependence of the descriptors on sample density is a direct one: as the number of ray-bounces increase, the shape descriptors converge, given a particular isosurface, irrespective of the randomness in the selection the starting positions and path directions.

Following computation of the PEST descriptors, these descriptors may be displayed in a number of formats according to the present invention. For example these surface descriptors may be displayed as one or two dimensional histograms. The converged plurality of surface descriptors may be separated into a plurality of bins based on ray length, angle of incidence, or a descriptor function value used to determine the surface descriptors. The binned surface descriptors may then be displayed as a one dimensional histogram.

Another exemplary display approach involves computing basic one-dimensional surface statistics. In calculating molecular surface properties and shapes, a surface histogram distribution may be created for each of a variety of molecular properties. This computation classifies each surface property point into a fixed set of histogram bins. The statistics may include the minimums, maximums, standard deviations, and averages of the various surface properties. Surface-based one-dimensional wavelet coefficient descriptors may also be calculated. In this step, a discrete wavelet transformation (symmlet 8) of the distribution of each property used in the histogram descriptors may be calculated. This information may be combined with similar calculations of the surface intersection points instead of all the surface points.

Figure 5:
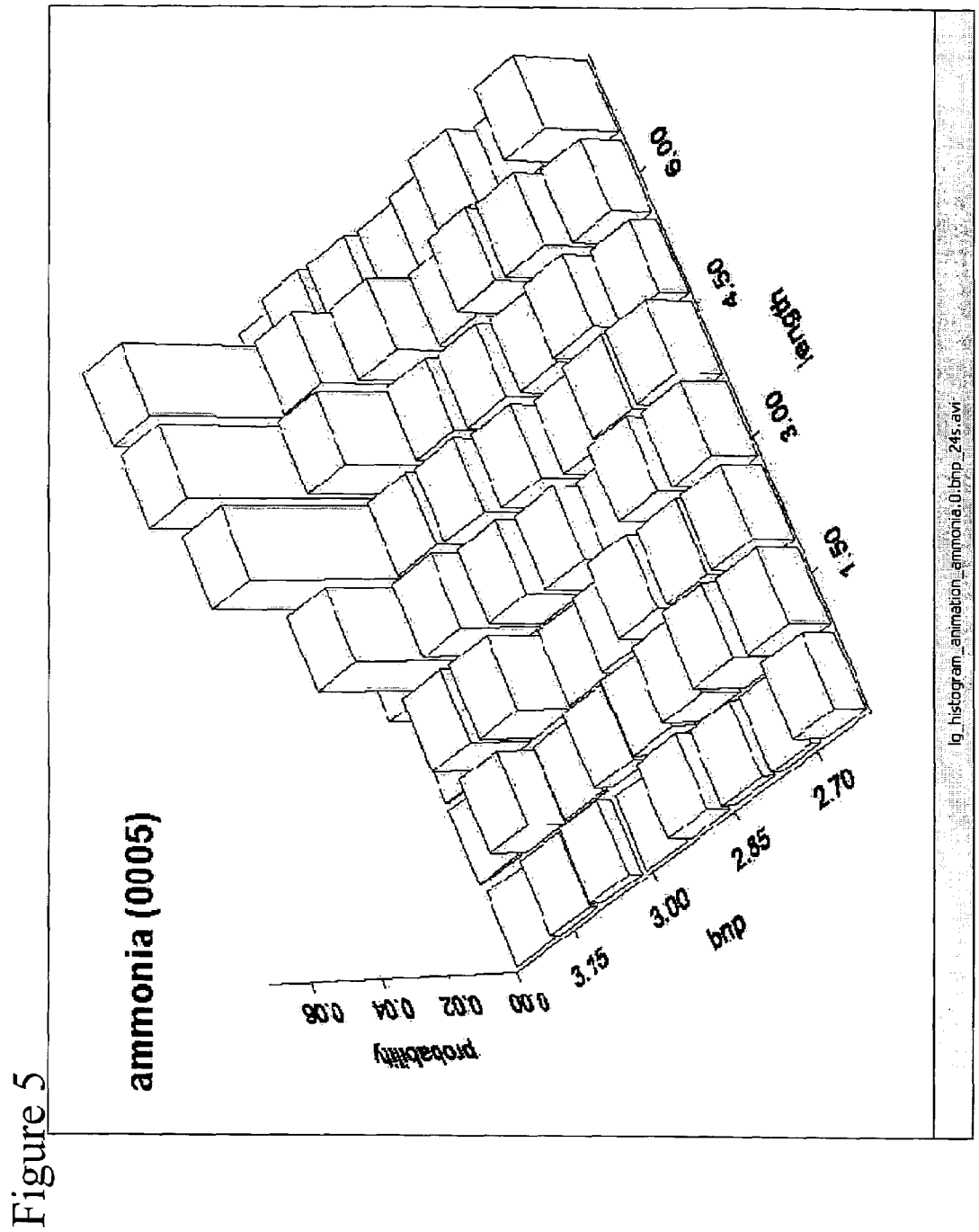
FIGS. 5, 6A and 6B are exemplary two dimensional histograms that may be used to display PEST descriptors according to the present invention.
Figure 6A:
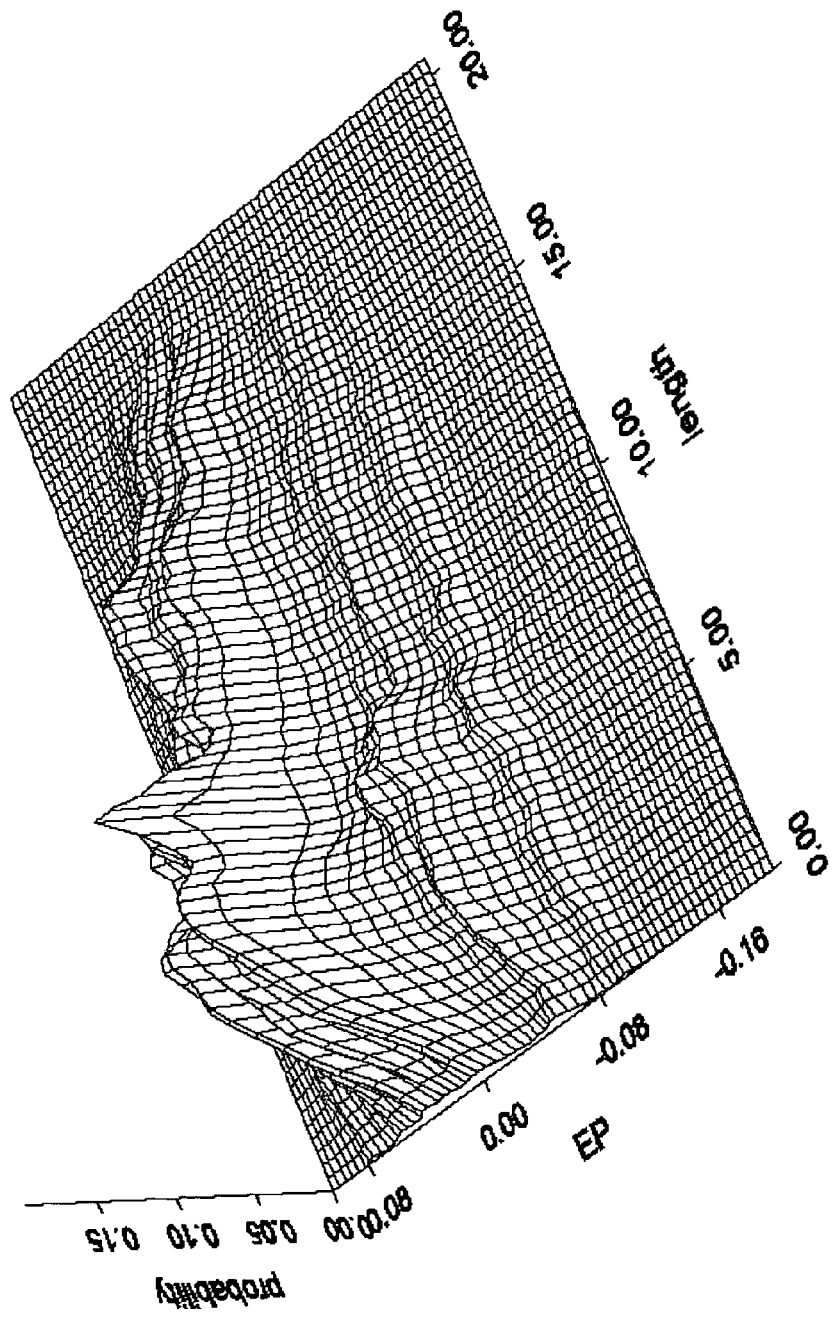
Figure 6B:
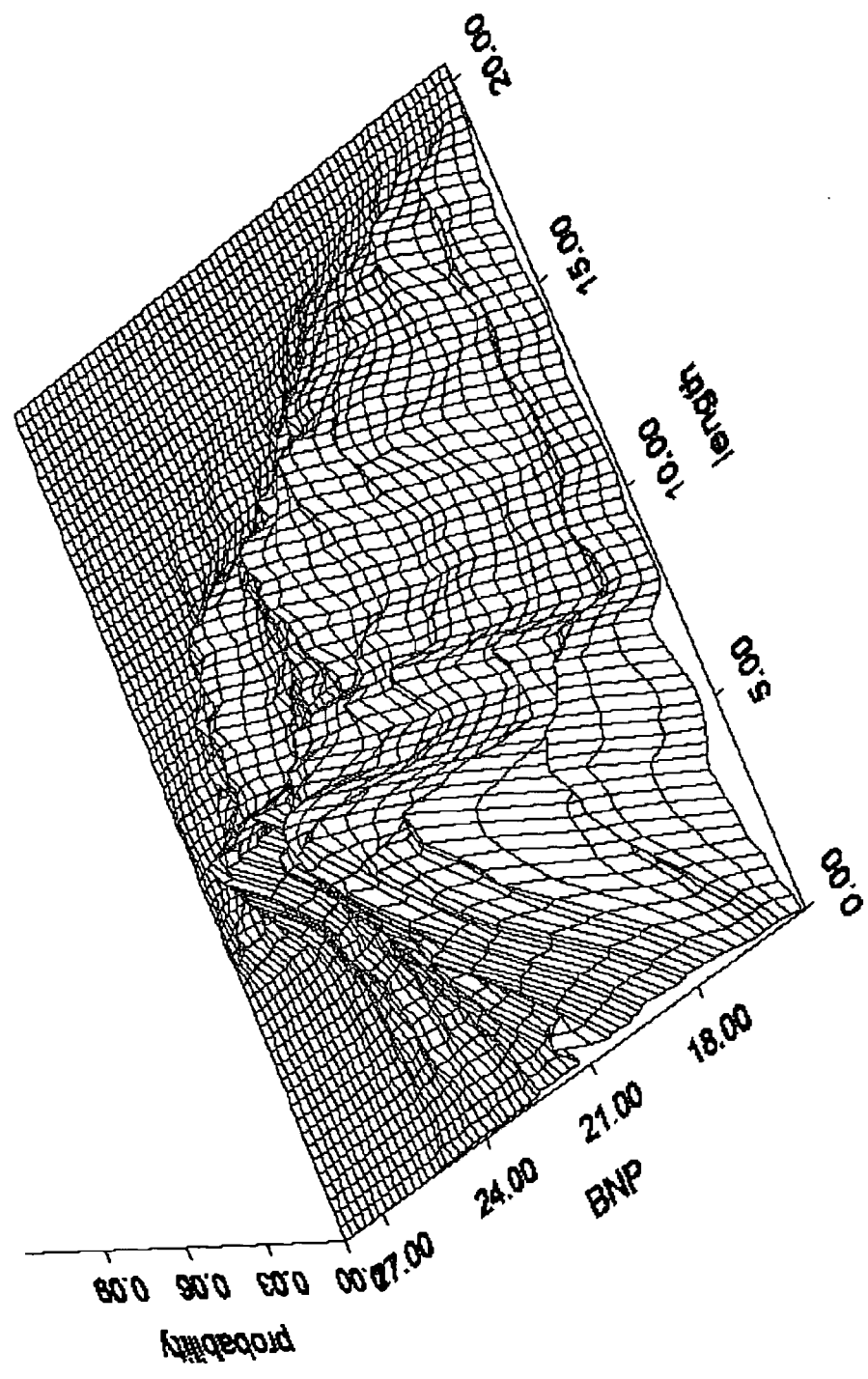

Similarly, the path information (i.e. distance between intersection points, angle of incidence, and the property values at the intersection points) may be summarized into two dimensional histograms to obtain a surface shape profile, as shown in FIGS. 5, 6A, and 6B. For a single encoded surface property of a molecular surface, as shown in these Figures, a two dimensional histogram having the distribution of distances (x-axis) versus the associated property value (y-axis) gives a characteristic distribution (z-axis), based on the overall shape and property value distribution of the molecule. Such a two dimensional histogram may be created for every surface property for every surface processed. FIGS. 6A and 6B illustrate differences between a two dimensional histogram of the distribution of electric potential (FIG. 6A) and a two dimensional histogram of the distribution of bare nuclear potential (FIG. 6B) for a morphine molecule. The bins of the two dimensional histograms may desirably be used directly as descriptors of the molecule in typical computational learning models.

The surface scan is actually a sampling from a set of two-dimensional distributions, referred to as surface profiles, that represents the shape information of the surface. A surface profile is a special distribution that relates the distance between two line-of-sight surface points and the surface values at those points; FIG. 3 is an example of a surface profile (A) and an associated 2D histogram approximation (B). For each surface property, a surface profile having the domain of length (x-axis) versus associated property value (y-axis) gives a characteristic distribution (z-axis) based on the overall shape and property value distribution of the molecule. These descriptors are the collection of bins from each property's surface profile's 2D histogram approximation, and are the ultimate results of the descriptor generation algorithm.

Figures 7A, 7B:
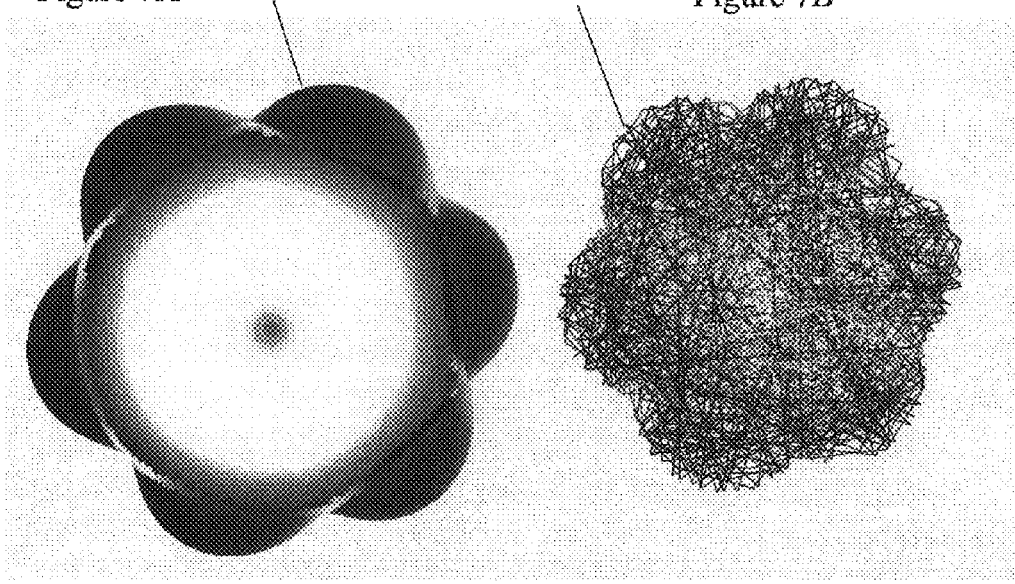
FIG. 7A is a top perspective drawing (provided in color and greyscale) illustrating an exemplary molecular surface distribution of Politzer's Ionization Potential (PIP).
FIG. 7B is a top perspective drawing (provided in color and greyscale) illustrating an exemplary graphical display of a ray trace distribution from the molecular surface calculation of FIG. 7A.

Another, graphical, format for displaying PEST descriptor information is shown in FIGS. 7A, 7B, 8, and 9. In this format the ray traces are displayed graphical illustrating not only the descriptor function value associated with the ray traces, but the spatial orientation and arrangement of the traces as well. FIG. 7A illustrates surface model 700 of a benzene molecule with false colors encoding Politzer's ionization potential (PIP). FIG. 7B illustrates ray traces 702 of the same molecule. Ray traces 702 are also shown in false color to encode the PIP of the molecule. To produce an image such as that shown in FIG. 7B, the converged surface descriptors computed in the exemplary method of FIG. 1 are separated into bins based on at least one of: ray length; angle of incidence; or a descriptor function value used to determine the surface descriptors. The rays are then displayed in false color representing various bins. Rays associated with only a desired subset of the subset of the bins may be selected for display.

Figure 8:
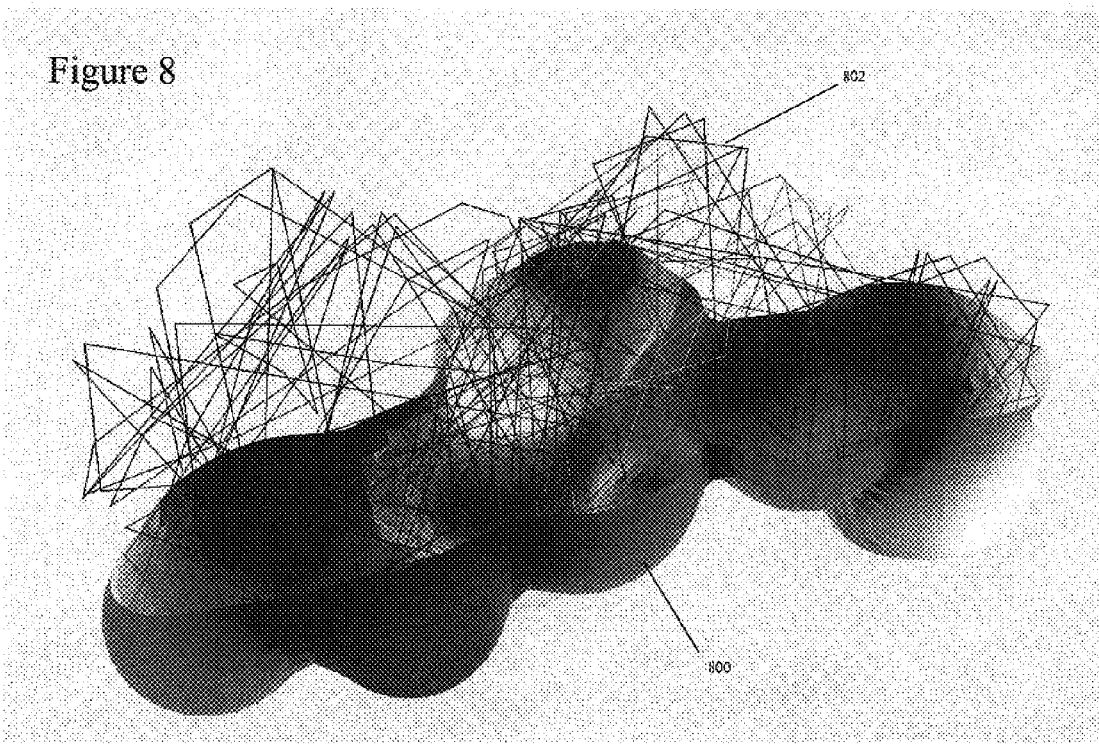
FIG. 8 is a front perspective drawing (provided in color and greyscale) illustrating another exemplary graphical display of a set of ray traces according to the present invention.

As shown in FIG. 8, rays 802 associated with the desired subset of surface descriptors may be displayed with cut-away false color representation of triangulated model 800 of the closed surface. In this exemplary image, the false colors of ray traces 802 may be used to represent another dimension of bins.

Figure 9:
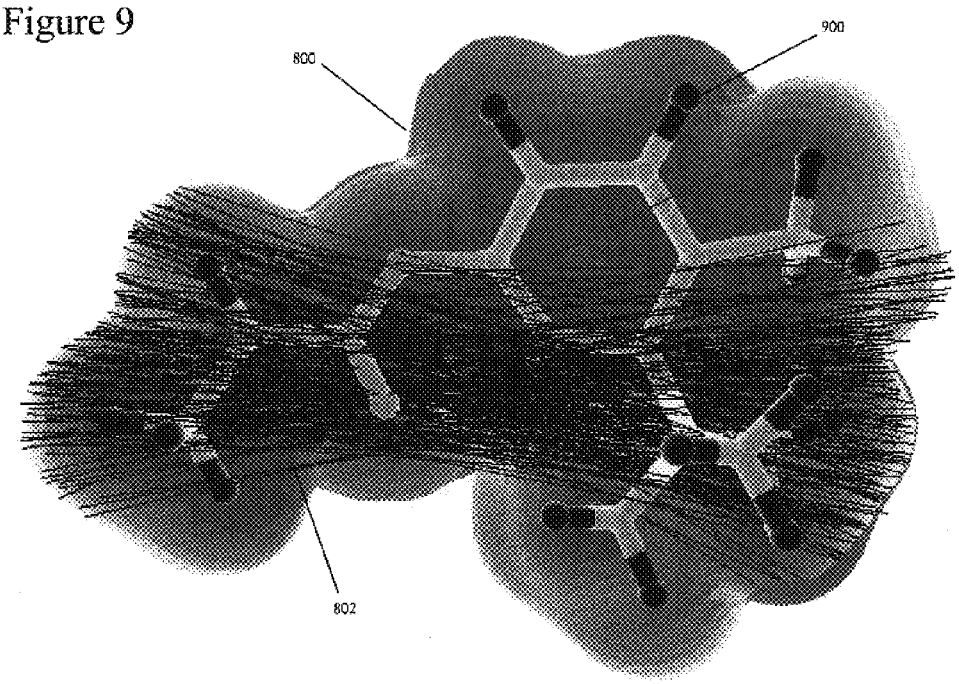
FIG. 9 is a top perspective drawing (provided in color and greyscale) illustrating a further exemplary graphical display of a subset of specific ray traces associated with a particular PEST shape/property histogram descriptor according to the present invention.

Alternatively, a transparent false color representation of triangulated model 800 of the closed surface may be displayed, as in FIG. 9, or a transparent model of internal structure within the closed surface may be displayed along with ray traces 802. In the example of a molecular surface, such as in FIG. 9, this inner structure may be transparent ball and stick model 900 of the molecule. In the example of a field potential isosurface of a field, this inner structure may be a transparent charge density model associated with the field.

Figure 10:
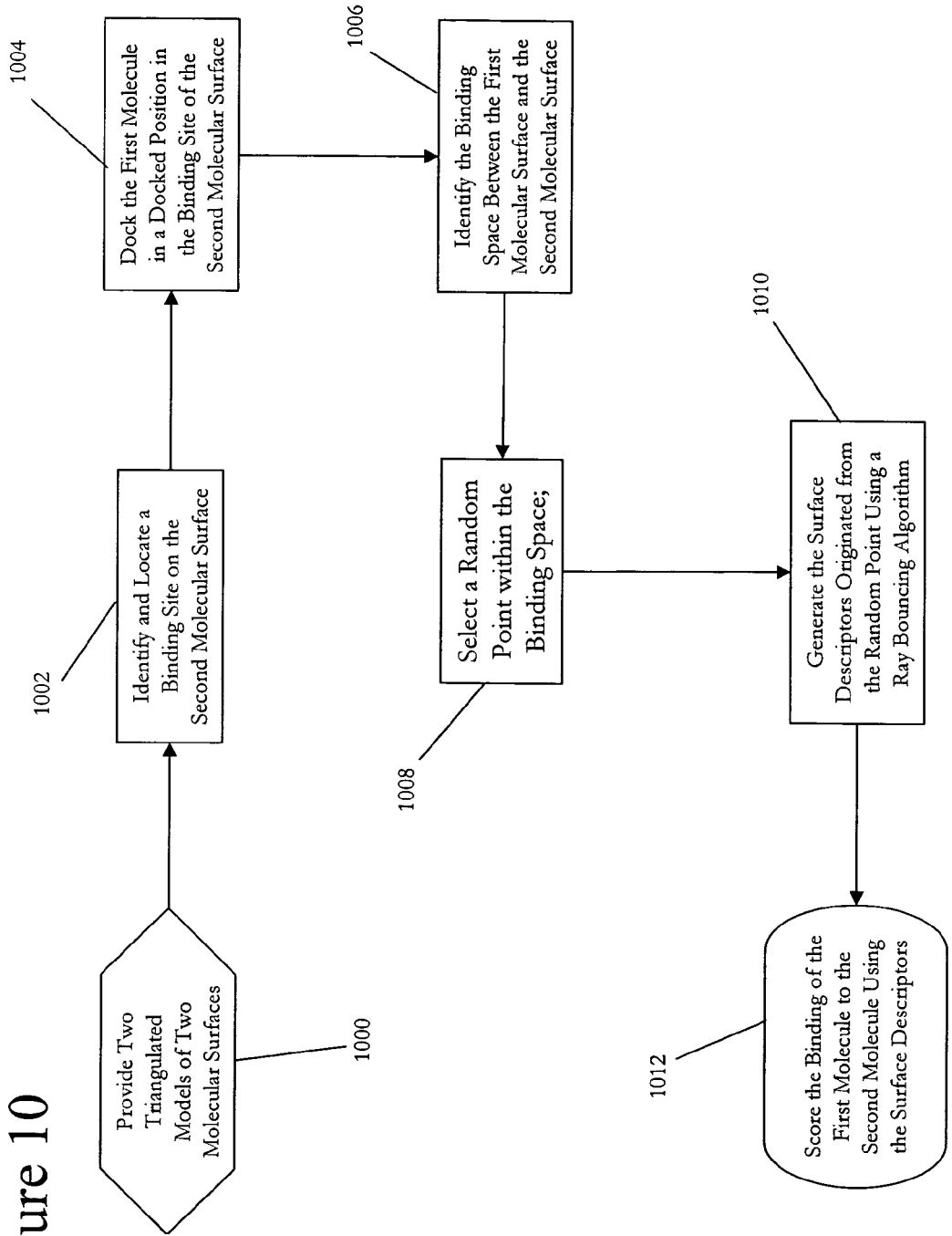
FIG. 10 is a flow chart illustrating the main components of an exemplary method of scoring the binding of two molecules using PEST descriptors according to the present invention.

FIG. 10 is a flowchart illustrating an exemplary method for computing a plurality of surface descriptors to score the binding of two molecules, such as a ligand and a protein. Each surface descriptor is encoded with a property of one of the molecular surfaces. Similar to the exemplary method of FIG. 1, this method begins with triangulated models of the molecular surface. A first triangulated model of the first molecular surface and a second triangulated model of the second molecular surface are provided by a triangulation means, step 1000.

A binding site on the second molecular surface is identified and located using the second triangulated model, step 1002. This binding site may be identified and located using software methods known in the art. The first molecule is then docked in a docked position, or pose, in the binding site of the second molecular surface, step 1004. This docking may be accomplished using a docking program, such as FLO, to manipulate the first triangulated model and the second triangulated model and determine the docked position.

A binding space between the docked first molecular surface and the second molecular surface is identified, step 1006. This step may be performed on a general purpose computer using the first triangulated model, the second triangulated model, and the docked position of the first molecule in the binding site, or by a special purpose processor.

A random point is then selected within the binding space, step 1008. This random point may be tested similarly to the random points selected in the exemplary method of FIG. 1 to verify that it is in the binding space, but it is desirable to artificially block openings of the binding space with false surfaces during this test.

The plurality of surface descriptors originating from the random point are then generated, step 1010, using a ray bouncing algorithm, such as, for example, the exemplary ray bouncing algorithm of FIG. 4. It is noted that it may be desirable to artificially block openings of the binding space with false surfaces during the ray bouncing algorithm as well. If the openings of the binding space are artificially blocked in this manner, it is desirable to assign a code to the false surfaces such that rays bouncing off of these surfaces are ignored in the calculation of the surface descriptors.

The binding of the first molecule to the second molecule is then scored, step 1012, using the plurality of surface descriptors generated by the ray bouncing algorithm. This scoring may identify not only the binding strength of the first molecule in the binding site, but also may allow analysis of the surfaces of the binding space to identify which portions of the first molecule and the binding site are more tightly bound and which portions may not be tightly bound, or even repulsive. Such analysis may provide a deeper understanding of the binding process and my lead to pharmacological improvements.

Figure 11:
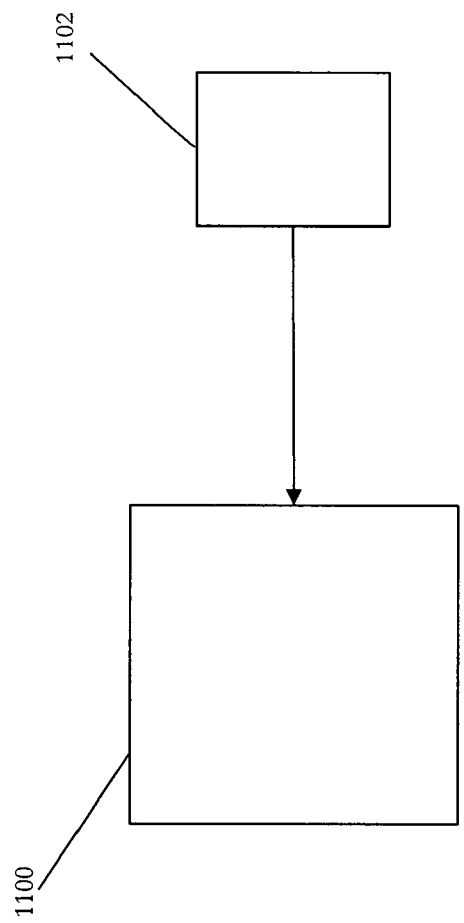
FIG. 11 is a schematic diagram illustrating an exemplary computer and computer readable medium that may be used to perform exemplary methods of the present invention.

It is contemplated that the methods previously described may be carried out within a general purpose computer system, such as exemplary computer 1100 illustrated in FIG. 11, instructed to perform these functions by means of computer-readable medium 1102. Such computer-readable media 1102 include; integrated circuits, magnetic and optical storage media. Additionally, it contemplate that many, if not all of the steps of these methods may be carried out by special purpose processors and/or circuitry.

The present invention includes an exemplary method and apparatus to compute surface descriptors. Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for computing a plurality of surface descriptors for a closed surface, each surface descriptor being encoded with a property of the closed surface, the method comprising the steps of:

a) providing a triangulated model of the closed surface including a plurality of triangles, each triangle having:
      three vertices, each vertex having a corresponding property value of the property;
      three edges, each edge connecting a pair of the three vertices; and
      a planar surface bounded by the three edges;
   b) selecting a plurality of random points within the closed surface;

c) generating, in parallel, a set of surface descriptors originated from each of the plurality of random points using a ray bouncing algorithm, wherein:
for each of the plurality of random points, the ray bouncing algorithm includes:
c1) tracing the ray from the random point in a random direction;
c2) determining the intersected planar surface of the intersected triangle of the plurality of triangles of the closed surface intersected by the ray;
c3) determining the point of intersection and an angle of incidence between the ray and the first planar surface;
c4) calculating the estimated property value at the point of intersection;
c5) determining the ray length using the point of intersection and a previous point of intersection;
c6) determining one of the plurality of surface descriptors;
c7) incrementing an iteration number;
c8) when the iteration number is less than a predetermined convergence testing number;
determining a bounce direction using the angle of incidence between the ray and the intersected planar surface;
tracing a new ray from the point of intersection in the bounce direction; and
repeating steps (c2), (c3), (c4), (c5),(c6), (c7), and (c8); and
c9) when the iteration number is equal to the predetermined convergence testing number, setting the iteration number to zero and continuing to step (d); and
each surface descriptor is determined using:
a ray length of a ray traced by the ray bouncing algorithm; and
an estimated property value at a point of intersection between the traced ray and an intersected planar surface of an intersected triangle of the plurality of triangles, the estimated property value calculated using the corresponding property values of the property at the three vertices of the intersected triangle;
d) determining whether a distribution of the plurality of sets of surface descriptors converge using a convergence algorithm;
e) repeating steps (c) and (d) until the distribution of the plurality of surface descriptors is determined to converge in step (d); and
f) storing the converged distribution of the plurality of surface descriptors.

2. The method according to claim 1, wherein:
the closed surface is a molecular surface of a molecule;
the property of the molecular surface is one of:
a surface integral of electrostatic potential;
an electrostatic potential;
an electron density gradient normal to the molecular surface;
an electronic kinetic energy density;
a gradient of the electronic kinetic energy density normal to the molecular surface;
a Fukui F+ function scalar value;
a Laplacian of the electron density;
a bare nuclear potential;
a local average ionization potential;
a Politzer ionization potential;
an area of an atomic van der Waals surface;
a surface integral of kinetic energy; or
a function thereof;
the triangulated model of the molecular surface provided in step (a) represents one of:
an electron density isosurface of the molecule;
a van der Waals surface of the molecule; or
a Connolly surface of the molecule; and
each planar surface of the plurality triangles in the triangulated model of the molecular surface has a surface area less than 1 Å$^2$.

3. The method according to claim 2, wherein, the surface area of each planar surface is in the range of 0.1 Å$^2$ to 0.5 Å$^2$.

4. The method according to claim 2, wherein, the triangulated model of the molecular surface provided in step (a) is generated based on at least one of:
empirical hard-sphere potential calculations;
Lennard-Jones potential calculations;
ab initio quantum calculations;
ab initio electron density surface calculations;
ab initio electronic properties calculations;
semi-empirical electron density surface calculations;
semi-empirical electronic properties calculations; or
atomic fragment-based transferable atom equivalents property-encoded surface reconstructions.

5. The method according to claim 2, further comprising the steps of:
g) separating the converged distribution of the plurality of surface descriptors into a plurality of bins based on at least one of ray length, angle of incidence, a descriptor function value used to determine the plurality of surface descriptors;
h) graphically displaying a transparent ball and stick model of the molecule; and
i) graphically displaying rays associated with a subset of the plurality of surface descriptors in at least one of the plurality of bins over the ball and stick model of the molecule.

6. The method according to claim 1, wherein:
the closed surface is a field potential isosurface of a field; and
the property of the field potential isosurface is one of:
field strength;
field strength normal to the field potential isosurface;
a surface integral of field strength;
a field energy density;
a gradient of the field energy density normal to the field potential isosurface;
a field energy current density normal to the field potential isosurface;
a component of a field momentum density;
a component of a field angular momentum density;
a gradient of the field potential normal to the field potential isosurface;
a divergence of the field;
a curl of the field; or
a function thereof.

7. The method according to claim 6, further comprising the steps of:
g) separating the converged distribution of the plurality of surface descriptors into a plurality of bins based on at least one of ray length, angle of incidence, a descriptor function value used to determine the plurality of surface descriptors;
h) graphically displaying a transparent charge density model associated with the field; and
i) graphically displaying rays associated with a subset of the plurality of surface descriptors in at least one of the plurality of bins over the charge density model.

8. The method according to claim 1, wherein:
the closed surface is a surface of a solid; and
the property of the surface is one of:
curvature of the surface;

pressure normal to the surface;
a component of stress;
a component of strain;
a component of shear;
compression;
tension;
deformation;
a flux through the surface; or
a function thereof.

9. The method according to claim 1, wherein:
the closed surface is a surface of a bodily organ; and
the property of the surface is one of:
blood flow parallel to the surface;
blood flow normal to the surface;
electrical activity;
a flux of a chemical through the surface;
temperature; or
a function thereof.

10. The method according to claim 1, wherein, a surface area of each planar surface of the plurality triangles in the triangulated model of the closed surface is selected such that a maximum variation of the property on any of the planar surfaces is less than a predetermined fraction of an average property value.

11. The method according to claim 1, wherein, step (a) further includes the step of organizing the plurality of triangles in the triangulated model of the closed surface using a space partitioning tree.

12. The method according to claim 11, wherein, the space partitioning tree is one of a binary space partitioning tree or an octree.

13. The method according to claim 11, wherein, the space partitioning tree partitions the triangles using one or more axes selected to substantially evenly divide the closed surface.

14. The method according to claim 1, wherein, step (b) includes the steps of:
b1) randomly selecting a trial point;
b2) generating a plurality of trial rays originated from the trial point, each of the trial rays pointing in a random direction;
b3) determining a number of triangles of the triangulated model intersected by each of the plurality of trial rays;
b4) counting trial rays for which the number of triangles intersected is odd;
b5) determining that the trial point is within the surface if the trial rays counted in step (b4) exceeds a predetermined number; and
b6) repeating steps (b1), (b2), (b3), (b4), and (b5) until the plurality of random points within the surface are selected.

15. The method according to claim 1, wherein, a number of random points within the surface selected in step (b) is sufficient to achieve a desired confidence level for convergence of the distribution of the plurality of surface descriptors in step (d).

16. The method according to claim 15, wherein, the number of random points within the surface selected in step (b) is greater than 10.

17. The method according to claim 16, wherein, the number of random points within the surface selected in step (b) is equal to 30.

18. The method according to claim 1, wherein, step (c2) includes the steps of:
c2I) searching the plurality of triangles of the closed surface to determine all triangles of the plurality of triangles of the closed surface intersected by a ray path of the ray;
c2II) determining a first triangle along the ray path of the ray to be the intersected triangle when at least one triangle is found along the ray path in step (c2I);
c2III) adding a random angular perturbation to the ray path of the ray when no triangles are found along the ray path in step (c2I) and repeating steps (c2I), (c2II), and (c2III); and
c2IV) after a predetermined number of unsuccessful iterations of step (c2III), determining that the ray has escaped the closed surface through a triangulation error, selecting a new random point within the closed surface, and continuing step (c).

19. The method according to claim 18, wherein:
step (a) further includes the step of organizing the plurality of triangles in the triangulated model of the closed surface using a space partitioning tree; and
step (c2I) includes the steps of:
c2Ia) identifying non-intersected spaces partitioned by the space partitioning tree;
c2Ib) culling triangles of the triangulated model that are in the non-intersected spaces identified in step (c2Ia) using the space partitioning tree; and
c2Ic) searching non-culled triangles to determine which triangles of the plurality of triangles of the closed surface are intersected by the ray path of the ray.

20. The method according to claim 1, wherein, step (c3) includes the steps of:
c3I) calculating an estimated point of intersection between the ray and the first planar surface using a line equation of the ray and a plane equation of the first planar surface;
c3II) determining the point of intersection between the ray and the first planar surface by moving a predetermined distance back along the ray from the estimated point of intersection;
c3III) defining a spherical coordinate system centered on the estimated point of intersection and having a normal to the first planar surface as a pole; and
c3IV) calculating the angle of intersection to be equal to a colatitude angle of the ray in the spherical coordinate system defined in step (c3III).

21. The method according to claim 1, wherein, step (c4) includes calculating the estimated property value at the point of intersection by averaging the corresponding property values of the property at the three vertices of the intersected triangle.

22. The method according to claim 1, wherein, step (c4) includes the steps of:
c4I) calculating distances from each of the three vertices of the intersected triangle to the point of intersection determined in step (c3);
c4II) calculating the estimated property value as a weighted average of the corresponding property values of the property at the three vertices of the intersected triangle using the distances calculated in step (c4I) to weight the corresponding property values.

23. The method according to claim 1, wherein, step (c4) includes the steps of:
c4I) formulating a smoothly varying function of the property over the intersected planar surface consistent with the corresponding property values of the property at the three vertices of the intersected triangle;
c4II) calculating the estimated property value at the point of intersection determined in step (c3) using the smoothly varying function of the property formulated in step (c4I).

24. The method according to claim 1, wherein, step (c6) includes forming a one dimensional descriptor that relates the ray length determined in step (c5) and a descriptor function based on the estimated property value calculated in step (c4).

25. The method according to claim 1, wherein:
step (c6) includes forming a one dimensional descriptor that relates the ray length determined in step (c5) and a descriptor function; and
the descriptor function is based on the estimated property value calculated in step (c4) and at least one of:
the ray length;
the angle of incidence determined in step (c3); or
a previous estimated property value corresponding to the previous point of intersection.

26. The method according to claim 1, wherein, step (c6) includes forming a one dimensional descriptor that relates the ray length determined in step (c5) and a descriptor autocorrelation function based on the estimated property value calculated in step (c4), the ray length, and a previous estimated property value corresponding to the previous point of intersection.

27. The method according to claim 1, wherein step (c6) includes forming a two dimensional descriptor that relates the ray length determined in step (c5), the angle of incidence determined in step (c3), and a descriptor function based on the estimated property value calculated in step (c4).

28. The method according to claim 1, wherein:
step (c6) includes forming a two dimensional descriptor that relates the ray length determined in step (c5), the angle of incidence determined in step (c3), and a descriptor function; and
the descriptor function is based on the estimated property value calculated in step (c4) and at least one of:
the ray length;
the angle of incidence determined in step (c3); and
a previous estimated property value corresponding to the previous point of intersection.

29. The method according to claim 1, wherein the predetermined convergence testing number is 1000 or greater.

30. The method according to claim 1, further comprising the steps of:
g) separating the converged plurality of surface descriptors into a plurality of bins based on one of ray length, angle of incidence, or a descriptor function value used to determine the plurality of surface descriptors; and
h) displaying the binned plurality of surface descriptors as a one dimensional histogram.

31. The method according to claim 1, further comprising the steps of:
g) separating the converged plurality of surface descriptors into a plurality of bins based on two of ray length, angle of incidence, or a descriptor function value used to determine the plurality of surface descriptors; and
h) displaying the binned plurality of surface descriptors as a two dimensional histogram.

32. The method according to claim 1, further comprising the steps of:
g) separating the converged plurality of surface descriptors into a plurality of bins based on at least one of ray length, angle of incidence, a descriptor function value used to determine the plurality of surface descriptors; and
h) graphically displaying rays associated with a subset of the plurality of surface descriptors in at least one of the plurality of bins.

33. The method according to claim 32, wherein:
a false color of a plurality of false colors is assigned to each of the at least one bin associated with the displayed rays; and
each displayed ray is displayed in the false color assigned to the bin containing it.

34. The method according to claim 32, wherein, the rays associated with the subset of surface descriptors are displayed with at least one of:
a transparent false color representation of the triangulated model of the closed surface;
a cut-away false color representation of the triangulated model of the closed surface; or
a transparent model of internal structure within the closed surface.

35. A method for computing a plurality of surface descriptors to score binding of a first molecule to a second molecule, each surface descriptor being encoded with a property of one of a first molecular surface of the first molecule or a second molecular surface of the second molecule, the method comprising the steps of:
a) providing a first triangulated model of the first molecular surface including a first plurality of triangles and a second triangulated model of the second molecular surface including a second plurality of triangles, each triangle having:
three vertices, each vertex having a corresponding property value of the property;
three edges, each edge connecting a pair of the three vertices; and
a planar surface bounded by the three edges;
b) identifying and locating a binding site on the second molecular surface using the second triangulated model;
c) docking the first molecule in a docked position in the binding site of the second molecular surface using the first triangulated model and the second triangulated model;
d) identifying a binding space between the first molecular surface and the second molecular surface using the first triangulated model, the second triangulated model, and the docked position of the first molecule;
e) selecting a random point within the binding space;
f) generating the plurality of surface descriptors originated from the random point using a ray bouncing algorithm, wherein each surface descriptor is determined using:
a ray length of a corresponding ray traced by the ray bouncing algorithm; and
an estimated property value at a point of intersection between the corresponding ray and an intersected planar surface of an intersected triangle of the plurality of triangles, the estimated property value calculated using the corresponding property values of the property at the three vertices of the intersected triangle;
g) scoring the binding of the first molecule to the second molecule using the plurality of surface descriptors generated in step (f).
h) storing the scored binding information of the first molecule to the second molecule.

36. A method for computing a plurality of surface descriptors to score binding of a first molecule to a second molecule, each surface descriptor being encoded with a property of one of a first molecular surface of the first molecule or a second molecular surface of the second molecule, the method comprising the steps of:
a) providing a first triangulated model of the first molecular surface including a first plurality of triangles and a second triangulated model of the second molecular surface including a second plurality of triangles, each triangle having:
three vertices, each vertex having a corresponding property value of the property;

three edges, each edge connecting a pair of the three vertices; and a planar surface bounded by the three edges;

b) identifying and locating a binding site on the second molecular surface using the second triangulated model;

c) docking the first molecule in a pose in the binding site of the second molecular surface using the first triangulated model and the second triangulated model;

d) identifying a binding space between the first molecular surface and the second molecular surface using the first triangulated model, the second triangulated model, and the pose of the first molecule;

e) selecting a random point within the binding space;

f) generating the plurality of surface descriptors originated from the random point using a ray bouncing algorithm, wherein each surface descriptor is determined using:

a ray length of a corresponding ray traced by the ray bouncing algorithm; and an estimated property value at a point of intersection between the corresponding ray and an intersected planar surface of an intersected triangle of the plurality of triangles, the estimated property value calculated using the corresponding property values of the property at the three vertices of the intersected triangle;

g) scoring the binding of the first molecule to the second molecule using the plurality of surface descriptors generated in step (f); and h) storing the scored binding information of the first molecule to the second molecule.

37. An apparatus for computing surface descriptors that are encoded with properties of a surface, the apparatus comprising:

triangulation means to calculate a triangulated model of the closed surface including a plurality of triangles, each triangle having:

three vertices, each vertex having a corresponding property value of the property;

three edges, each edge connecting a pair of the three vertices; and a planar surface bounded by the three edges;

random point selection means to select a plurality of random points within the closed surface;

a parallel processor to generate, in parallel, a set of surface descriptors originated from each of the plurality of random points using a ray bouncing algorithm, each processor of the parallel processor determines a surface descriptor using:

a ray length of a ray traced by the ray bouncing algorithm; and an estimated property value at a point of intersection between the traced ray and an intersected planar surface of an intersected triangle of the plurality of triangles, the estimated property value calculated using the corresponding property values of the property at the three vertices of the intersected triangle; and a convergence processor to determine when a distribution of the plurality of sets of surface descriptors converges;

wherein, for each of the plurality of random points, the ray bouncing algorithm used by the parallel processor includes the steps of:

a) tracing the ray from the random point in a random direction;

b) determining the intersected planar surface of the intersected triangle of the plurality of triangles of the closed surface intersected by the ray;

c) determining the point of intersection and an angle of incidence between the ray and the first planar surface;

d) calculating the estimated property value at the point of intersection;

e) determining the ray length using the point of intersection and a previous point of intersection;

f) determining one of the plurality of surface descriptors;

g) incrementing an iteration number;

h) when the iteration number is less than a predetermined convergence testing number;

determining a bounce direction using the angle of incidence between the ray and the intersected planar surface;

tracing a new ray from the point of intersection in the bounce direction; and repeating steps (b), (c), (d), (e), (f), (g), and (h); and i) when the iteration number is equal to the predetermined convergence testing number, setting the iteration number to zero.

38. An apparatus for computing a plurality of surface descriptors to score binding of a first molecule to a second molecule, each surface descriptor being encoded with a property of one of a first molecular surface of the first molecule or a second molecular surface of the second molecule, the apparatus comprising:

triangulation means to calculate a first triangulated model of the first molecular surface including a first plurality of triangles and a second triangulated model of the second molecular surface including a second plurality of triangles, each triangle having:

three vertices, each vertex having a corresponding property value of the property;

three edges, each edge connecting a pair of the three vertices; and a planar surface bounded by the three edges;

binding site location means to identify and locate a binding site on the second molecular surface using the second triangulated model;

docking means to dock the first molecule in a docked position in the binding site of the second molecular surface using the first triangulated model and the second triangulated model;

binding space identification means to identify a binding space between the first molecular surface and the second molecular surface using the first triangulated model, the second triangulated model, and the docked position of the first molecule;

random point selection means to select a random point within the binding space;

a processor to generate the plurality of surface descriptors originated from the random point using a ray bouncing algorithm, wherein each surface descriptor is determined using:

a ray length of a corresponding ray traced by the ray bouncing algorithm; and an estimated property value at a point of intersection between the corresponding ray and an intersected planar surface of an intersected triangle of the plurality of triangles, the estimated property value calculated using the corresponding property values of the property at the three vertices of the intersected triangle; and scoring means to score the binding of the first molecule to the second molecule using the plurality of surface descriptors.

39. An apparatus for computing a plurality of surface descriptors to score binding of a first molecule to a second molecule, each surface descriptor being encoded with a property of one of a first molecular surface of the first molecule or a second molecular surface of the second molecule, the apparatus comprising:

triangulation means to calculate a first triangulated model of the first molecular surface including a first plurality of triangles and a second triangulated model of the second molecular surface including a second plurality of triangles, each triangle having:

three vertices, each vertex having a corresponding property value of the property;

three edges, each edge connecting a pair of the three vertices; and a planar surface bounded by the three edges;

binding site location means to identify and locate a binding site on the second molecular surface using the second triangulated model;

docking means to dock the first molecule in a pose in the binding site of the second molecular surface using the first triangulated model and the second triangulated model;

binding space identification means to identify a binding space between the first molecular surface and the second molecular surface using the first triangulated model, the second triangulated model, and the pose of the first molecule;

random point selection means to select a random point within the binding space;

a processor to generate the plurality of surface descriptors originated from the random point using a ray bouncing algorithm, wherein each surface descriptor is determined using:

a ray length of a corresponding ray traced by the ray bouncing algorithm; and an estimated property value at a point of intersection between the corresponding ray and an intersected planar surface of an intersected triangle of the plurality of triangles, the estimated property value calculated using the corresponding property values of the property at the three vertices of the intersected triangle; and scoring means to score the binding of the first molecule to the second molecule using the plurality of surface descriptors.

40. A computer readable medium adapted to instruct a general purpose computer to compute a plurality of surface descriptors for a closed surface, each surface descriptor being encoded with a property of the closed surface, the method comprising the steps of:

a) providing a triangulated model of the closed surface including a plurality of triangles, each triangle having:

three vertices, each vertex having a corresponding property value of the property;

three edges, each edge connecting a pair of the three vertices; and a planar surface bounded by the three edges;

b) selecting a plurality of random points within the closed surface;

c) generating, in parallel, a set of surface descriptors originated from each of the plurality of random points using a ray bouncing algorithm, wherein:

for each of the plurality of random points, the ray bouncing algorithm includes:

c1) tracing the ray from the random point in a random direction;

c2) determining the intersected planar surface of the intersected triangle of the plurality of triangles of the closed surface intersected by the ray;

c3) determining the point of intersection and an angle of incidence between the ray and the first planar surface;

c4) calculating the estimated property value at the point of intersection;

c5) determining the ray length using the point of intersection and a previous point of intersection;

c6) determining one of the plurality of surface descriptors;

c7) incrementing an iteration number;

c8) when the iteration number is less than a predetermined convergence testing number;

determining a bounce direction using the angle of incidence between the ray and the intersected planar surface;

tracing a new ray from the point of intersection in the bounce direction; and repeating steps (c2), (c3), (c4), (c5), (c6), (c7), and (c8); and c9) when the iteration number is equal to the predetermined convergence testing number, setting the iteration number to zero and continuing to step (d); and each surface descriptor is determined using:

a ray length of a ray traced by the ray bouncing algorithm; and an estimated property value at a point of intersection between the traced ray and an intersected planar surface of an intersected triangle of the plurality of triangles, the estimated property value calculated using the corresponding property values of the property at the three vertices of the intersected triangle;

d) determining whether a distribution of the plurality of sets of surface descriptors converge using a convergence algorithm;

e) repeating steps (c) and (d) until the distribution of the plurality of surface descriptors is determined to converge in step (d); and f) storing the converged distribution of the plurality of surface descriptors.

41. A computer readable medium adapted to instruct a general purpose computer to compute a plurality of surface descriptors to score binding of a first molecule to a second molecule, each surface descriptor being encoded with a property of one of a first molecular surface of the first molecule or a second molecular surface of the second molecule, the method comprising the steps of:

a) providing a first triangulated model of the first molecular surface including a first plurality of triangles and a second triangulated model of the second molecular surface including a second plurality of triangles, each triangle having;

three vertices, each vertex having a corresponding property value of the property;

three edges, each edge connecting a pair of the three vertices; and a planar surface bounded by the three edges;

b) identifying and locating a binding site on the second molecular surface using the second triangulated model;

c) docking the first molecule in a docked position in the binding site of the second molecular surface using the first triangulated model and the second triangulated model;

d) identifying a binding space between the first molecular surface and the second molecular surface using the first triangulated model, the second triangulated model, and the docked position of the first molecule;

e) selecting a random point within the binding space;
f) generating the plurality of surface descriptors originated from the random point using a ray bouncing algorithm, wherein each surface descriptor is determined using:
a ray length of a corresponding ray traced by the ray bouncing algorithm; and
an estimated property value at a point of intersection between the corresponding ray and an intersected planar surface of an intersected triangle of the plurality of triangles, the estimated property value calculated using the corresponding property values of the property at the three vertices of the intersected triangle;
g) scoring the binding of the first molecule to the second molecule using the plurality of surface descriptors generated in step (f); and
h) storing the scored binding information of the first molecule to the second molecule.

42. A computer readable medium adapted to instruct a general purpose computer to compute a plurality of surface descriptors to score binding of a first molecule to a second molecule, each surface descriptor being encoded with a property of one of a first molecular surface of the first molecule or a second molecular surface of the second molecule, the method comprising the steps of:
a) providing a first triangulated model of the first molecular surface including a first plurality of triangles and a second triangulated model of the second molecular surface including a second plurality of triangles, each triangle having:
three vertices, each vertex having a corresponding property value of the property;
three edges, each edge connecting a pair of the three vertices; and
a planar surface bounded by the three edges;
b) identifying and locating a binding site on the second molecular surface using the second triangulated model;
c) docking the first molecule in a pose in the binding site of the second molecular surface using the first triangulated model and the second triangulated model;
d) identifying a binding space between the first molecular surface and the second molecular surface using the first triangulated model, the second triangulated model, and the pose of the first molecule;
e) selecting a random point within the binding space;
f) generating the plurality of surface descriptors originated from the random point using a ray bouncing algorithm, wherein each surface descriptor is determined using:
a ray length of a corresponding ray traced by the ray bouncing algorithm; and
an estimated property value at a point of intersection between the corresponding ray and an intersected planar surface of an intersected triangle of the plurality of triangles, the estimated property value calculated using the corresponding property values of the property at the three vertices of the intersected triangle;
g) scoring the binding of the first molecule to the second molecule using the plurality of surface descriptors generated in step (f); and
h) storing the scored binding information of the first molecule to the second molecule.

* * * * *